United States Patent
Ozasa et al.

(10) Patent No.: US 8,063,572 B2
(45) Date of Patent: Nov. 22, 2011

(54) HIGH-PRESSURE DISCHARGE LAMP LIGHTING DEVICE

(75) Inventors: Minoru Ozasa, Kyoto (JP); Syunsuke Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/908,736

(22) Filed: Oct. 20, 2010

(65) Prior Publication Data

US 2011/0037402 A1    Feb. 17, 2011

Related U.S. Application Data

(62) Division of application No. 11/577,701, filed as application No. PCT/JP2005/020772 on Nov. 8, 2005, now Pat. No. 7,855,512.

(30) Foreign Application Priority Data

Nov. 11, 2004 (JP) .................. 2004-328199

(51) Int. Cl.
H05B 37/02 (2006.01)

(52) U.S. Cl. ............. 315/224; 315/247; 315/209 R; 315/291; 315/307

(58) Field of Classification Search ........ 315/247, 315/224, 209 R, 185 S, 291, 307
See application file for complete search history.

(56) References Cited

U.S. PATENT DOCUMENTS

| | | | |
|---|---|---|---|
| 4,373,146 A | 2/1983 | Bonazoli et al. | |
| 5,365,151 A | 11/1994 | Spiegel et al. | |
| 6,545,430 B2 | 4/2003 | Ono et al. | |
| 6,943,503 B2 | 9/2005 | Ozasa et al. | |
| 7,023,144 B2 | 4/2006 | Suzuki et al. | |
| 7,122,960 B2 | 10/2006 | Tukamoto et al. | |
| 2001/0038267 A1 | 11/2001 | Ono et al. | |
| 2002/0105288 A1 | 8/2002 | Nakagawa et al. | |
| 2004/0000880 A1 | 1/2004 | Ozasa et al. | |
| 2004/0090184 A1 | 5/2004 | Arimoto et al. | |
| 2004/0178733 A1 | 9/2004 | Tukamoto et al. | |
| 2005/0206326 A1 | 9/2005 | Suzuki et al. | |
| 2006/0022613 A1 | 2/2006 | Suzuki et al. | |
| 2006/0066261 A1 | 3/2006 | Rahmane et al. | |

FOREIGN PATENT DOCUMENTS

| | | |
|---|---|---|
| CN | 2267603 | 11/1997 |
| EP | 1 150 336 | 10/2001 |
| JP | 4-303592 | 10/1992 |
| JP | 2001-312997 | 11/2001 |
| JP | 2002-175890 | 6/2002 |
| JP | 2003-338394 | 11/2003 |
| JP | 2006-059790 | 3/2006 |
| WO | 2004/089044 | 10/2004 |

OTHER PUBLICATIONS

Chinese Application No. 200580038614.8 Office Action dated Jun. 30, 2011, 21 pages with English translation.
Japanese Application No. 2004-328199 Office Action dated Dec. 14, 2010, 2 pages.
Japanese Application No. 2004-328199 Office Action dated Sep. 8, 2010, 2 pages.

*Primary Examiner* — Tuyet Thi Vo

(57) ABSTRACT

The high-pressure discharge lamp lighting device of the invention includes a lighting circuit for supplying an alternating current to a high-pressure discharge lamp to cause lighting, the high-pressure discharge lamp having an arc tube in which a halogen material is enclosed and a pair of electrodes is disposed, and each electrode having a protuberance at a tip thereof. A frequency of the alternating current varies without dependency on operating data that varies as a lighting time of the high-pressure discharge lamp elapses.

6 Claims, 16 Drawing Sheets

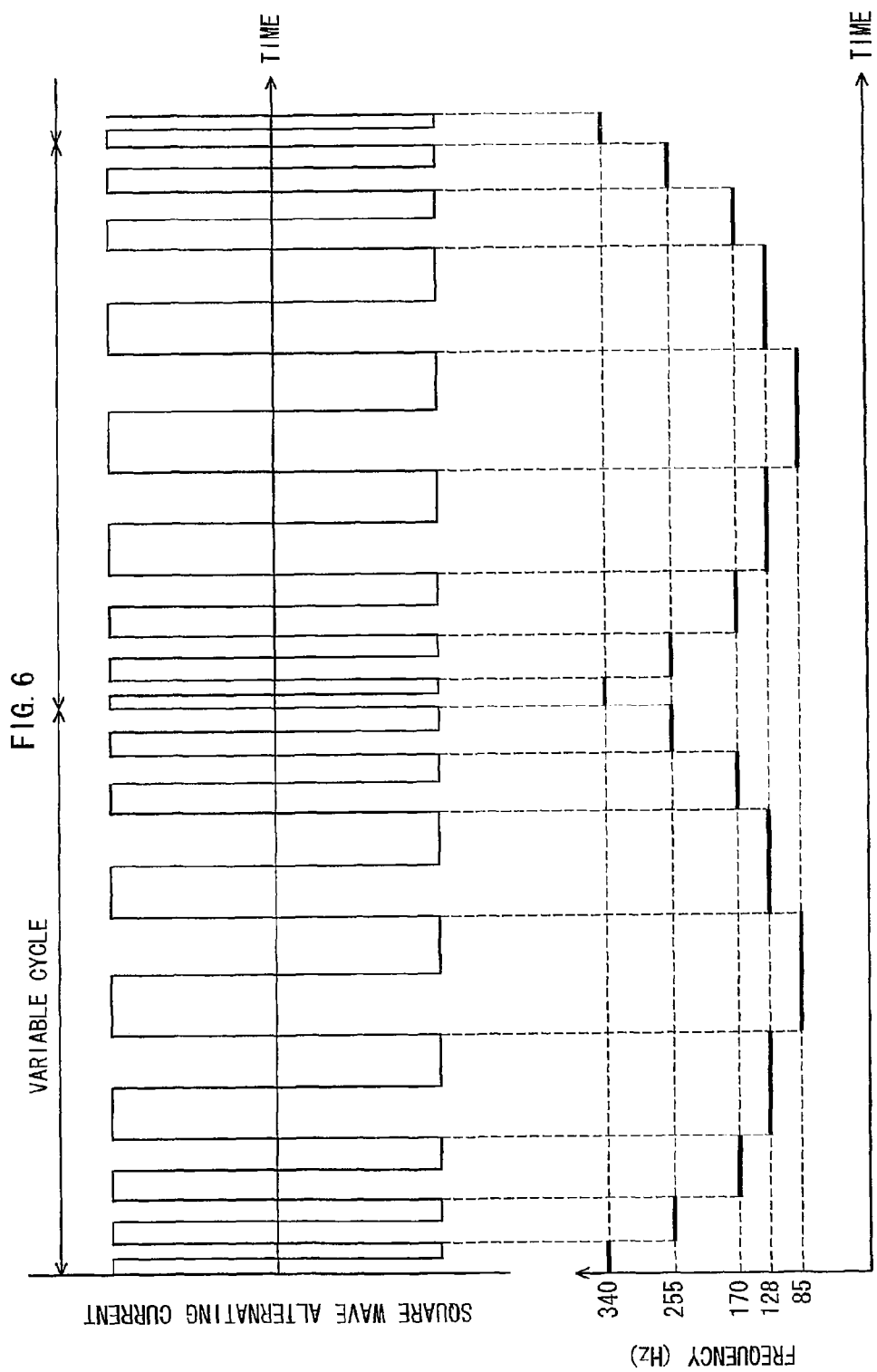

FIG. 8

| LUMINANCE TRANSITION | | | | | |
|---|---|---|---|---|---|
| ELAPSED TIME | PRIOR ART (FIXED FREQUENCY) | | | | EMBODIMENT (VARIABLE FREQUENCY) |
| | 85Hz | 170Hz | 340Hz | 510Hz | 85~340Hz |
| 1 | 100 | 100 | 100 | 100 | 100 |
| 2 | 100 | 99 | 99 | 97 | 99 |
| 3 | 101 | 100 | 99 | 95 | 98 |
| 4 | 102 | 101 | 97 | 93 | 99 |
| 5 | 103 | 102 | 96 | 92 | 99 |
| 6 | 104 | 103 | 95 | 90 | 98 |
| 7 | 106 | 104 | 94 | 88 | 99 |
| 8 | 107 | 106 | 93 | 87 | 99 |
| 9 | 109 | 108 | 93 | 85 | 100 |
| 10 | 112 | 109 | 92 | 83 | 101 |
| 20 | 116 | 111 | 91 | 82 | 102 |
| 30 | 110 | 107 | 90 | 79 | 104 |
| 40 | 100 | 105 | 87 | 78 | 106 |
| 50 | 80 | 104 | 85 | 75 | 103 |
| 60 | 60 | 100 | 84 | 74 | 104 |
| 70 | 40 | 98 | 83 | 72 | 102 |
| 80 | | 95 | 81 | 71 | 100 |
| 90 | | 93 | 80 | 65 | 100 |
| 100 | | 91 | 77 | 59 | 99 |
| 250 | | 84 | 71 | 40 | 94 |
| 500 | | 80 | 62 | | 90 |
| 750 | | 75 | 52 | | 85 |
| 1000 | | 72 | 46 | | 81 |
| 1500 | | 65 | | | 79 |
| 2000 | | 59 | | | 76 |
| 2500 | | 52 | | | 73 |
| 3000 | | 48 | | | 68 |
| 3500 | | | | | 66 |
| 4000 | | | | | 64 |
| 4500 | | | | | 61 |
| 5000 | | | | | 58 |
| 5500 | | | | | 56 |
| 6000 | | | | | 53 |
| 6500 | | | | | 51 |
| 7000 | | | | | 49 |

FIG. 9

| VOLTAGE TRANSITION | | | | | |
|---|---|---|---|---|---|
| ELAPSED TIME | PRIOR ART (FIXED FREQUENCY) | | | | EMBODIMENT (VARIABLE FREQUENCY) |
| | 85Hz | 170Hz | 340Hz | 510Hz | 85~340Hz |
| 1 | 70 | 70 | 70 | 70 | 70 |
| 2 | 68 | 69 | 70 | 72 | 70 |
| 3 | 66 | 68 | 70 | 74 | 71 |
| 4 | 64 | 67 | 72 | 76 | 69 |
| 5 | 63 | 66 | 73 | 78 | 70 |
| 6 | 60 | 65 | 74 | 80 | 71 |
| 7 | 57 | 63 | 75 | 82 | 70 |
| 8 | 55 | 61 | 76 | 84 | 69 |
| 9 | 52 | 59 | 77 | 86 | 68 |
| 10 | 46 | 57 | 78 | 88 | 67 |
| 20 | 39 | 55 | 79 | 90 | 66 |
| 30 | 41 | 60 | 80 | 93 | 64 |
| 40 | 45 | 62 | 84 | 94 | 62 |
| 50 | 47 | 64 | 86 | 98 | 65 |
| 60 | 48 | 68 | 87 | 99 | 64 |
| 70 | 49 | 71 | 89 | 101 | 66 |
| 80 | 52 | 74 | 91 | 103 | 68 |
| 90 | 56 | 77 | 92 | 110 | 68 |
| 100 | 60 | 79 | 95 | 117 | 70 |
| 250 | | 87 | 103 | 140 | 75 |
| 500 | | 92 | 113 | | 79 |
| 750 | | 98 | 125 | | 84 |
| 1000 | | 102 | 133 | | 88 |
| 1500 | | 110 | | | 91 |
| 2000 | | 117 | | | 94 |
| 2500 | | 125 | | | 97 |
| 3000 | | 130 | | | 102 |
| 3500 | | | | | 104 |
| 4000 | | | | | 106 |
| 4500 | | | | | 109 |
| 5000 | | | | | 113 |
| 5500 | | | | | 115 |
| 6000 | | | | | 118 |
| 6500 | | | | | 120 |
| 7000 | | | | | 122 |

HIGH-PRESSURE DISCHARGE LAMP LIGHTING DEVICE

This is a divisional application from U.S. Ser. No. 11/577,701 filed on Apr. 20, 2007 which is a §371 application of PCT/JP05/20772 filed on Nov. 8, 2005, which claims priority from Japanese Application No. 2004-328199 filed on Nov. 11, 2004.

TECHNICAL FIELD

The present invention relates to a high-pressure discharge lamp lighting device, a high-pressure discharge lamp apparatus, a projector-type image display device, and a high-pressure discharge lamp lighting method, and relates in particular to a high-pressure discharge lamp lighting device that causes current to flow in a high-pressure discharge lamp causing lighting.

BACKGROUND ART

Among high-pressure discharge lamps, the high-pressure mercury lamp, which is used as a light source in projector-type image display devices such as liquid crystal projectors and the like, has in recent years been attracting particular attention (see Japanese Laid-open Patent Application No. H4-303592).

Generally, the high-pressure mercury lamp has a pair of opposing electrodes disposed inside an arc tube enclosing a halogen material, an inert gas, and mercury. A high-pressure discharge lamp lighting device applies a predetermined high voltage pulse to the high-pressure discharge lamp to give dielectric breakdown between the electrodes, and subsequently causes an alternating current of a predetermined frequency to flow thereby causing the lamp to light.

The life of such high-pressure mercury lamps is of the order of 2000 hours to 3000 hours.

Liquid crystal projectors in the past were used mainly in school classrooms, conference rooms, and the like, but in recent years have become increasingly popular with ordinary households.

Liquid crystal projectors use as their light source what is, with discharge being caused in the short gap between the electrodes to generate light, essentially a point light source. Consequently, image stability is strongly influenced by discharge stability. For this reason, lamp constructions and lighting methods for ensuring discharge stability in discharge lamps, such as the constructions and methods described below, have been in use for some time.

The high-pressure mercury lamps currently in use in liquid crystal projectors generally include, besides mercury, a halogen material as one of the enclosed materials. This is because the halogen cycle of the enclosed halogen material prevents the occurrence of lamp blackening due to the electrode ingredient tungsten evaporating during lighting. This halogen cycle operation is very effective in the prevention of lamp blackening. However, as the cycle continues, tungsten transferred to the tips of the electrodes via the cycle accumulates thereon, forming protuberances. The growth of such protuberances can be controlled by varying the frequency of the supplied alternating current, a method disclosed in Japanese Laid-open Patent Application No. 2001-312997 and in Japanese Laid-open Patent Application No. 2003-338394. Using this method, stability in the luminance when the lamp is dispatched is achieved by shortening the distance between the electrodes through the formation of suitable protuberances to make a point light source.

Further, growth of the protuberances during the first 100 to 500 hours or thereabouts of the life can be suppressed by varying the frequency of the supplied AC current, a method which is disclosed in Japanese Laid-open Patent Application No. 2003-338394. Using this method, the excessive growth of the protuberances generated in the first 100 to 500 hours or thereabouts of the life can be suppressed, and stability in intensity is achieved. The method involves detecting a discharge voltage and, with the voltage variation as a reference, performing feedback control to restore the tips of the electrodes.

DISCLOSURE OF THE INVENTION

However, in recent years a new problem has arisen as a result of the range of applications for liquid crystal projectors displays expanding to include home theater systems capable of wide screen display an of displaying television pictures. The projectors used principally in school classrooms and conference rooms generally displayed still images, and were in use for a maximum of a few hours each day. The projectors used as TV displays or home theaters, on the other hand, generally display moving pictures. Moreover, such projectors are used continuously. Hence, it can be assumed that a period of use is incomparably longer than that of previous technologies. Moreover, the requirement for subtle variations in brightness, color reproduction, and the like is stricter for images displayed on a home theater system and for television pictures than for images displayed on a computer screen. Long-term stability is therefore required in the lamp. Consequently, the 2000 to 3000 hour life of the projectors that were used mainly in the school classroom and conference rooms is insufficient, and a life several times that of previous lamps is required. Furthermore, color reproduction, brightness, and the like are required to be exceedingly stable for the duration of this longer life.

However, application of these previously available lighting methods in devices such as home theater systems capable of realizing television screens and large screens did not enable a long life (6000 hours, for instance) and stable color reproduction and brightness to be obtained. Analysis of the reasons for this revealed the following. Protuberance growth at the tips of the electrodes is marked in the initial period of lighting, but subsequently, in the period between 2000 hours and 3000 hours of lighting, instead of further protuberance growth there is a slowly progressing size reduction, and the gap between the electrodes widens. Because of this, the discharge region gradually expands and the intensity of the optical device drops. In the lamp lighting method of previous lamps this was controlled by detecting the discharge voltage and varying the frequency of the supplied alternating current, but the variation of the discharge voltage in this process is slow, and such a control method does not work effectively. Further, the optimum conditions for controlling the protuberance growth and contraction vary because electrical properties of the lamp alter slowly as its driving period progresses. For reasons such as this, in the period spanning between 2000 and 3000 hours after lamp driving was begun, it was difficult to perfectly maintain the initial form of the electrodes by means of the control method for keeping the same driving frequency condition.

Moreover, there is the issue of stability for the subtly varying properties such as color reproduction and brightness of the displayed image. As previously indicated, in displays such as home theater systems capable of realizing television pictures and large screens, long-term stability is required. Analysis of this problem reveals that the key to maintaining stability is to maintain the form of the electrode tips. The central point of emission from the light source is located in the lamp electrode gap. The brightness and color reproduction of the projector are influenced by the size of the central point of emission, and the location of the same point is important because of its relationship with the optical axis of the optical system. As a consequence, if the form of the electrodes is maintained, it is possible to maintain stability of properties such as the subtle variations in image color reproduction and brightness.

It is an object of the present invention to provide a high-pressure discharge lamp lighting device, a high-pressure discharge lamp apparatus, a projection-type image display apparatus, and a high-pressure discharge lamp lighting method all of which are capable of improving a life that is determined as the period before a certain drop in intensity, and of maintaining over the life stability with respect to properties such as the subtle variation of color reproduction, brightness and the like.

In order to achieve this object the high-pressure discharge lamp lighting device of the invention includes: a lighting circuit operable to supply an alternating current to a high-pressure discharge lamp to cause lighting, the high-pressure discharge lamp having an arc tube in which a halogen material is enclosed and a pair of electrodes is disposed, and each electrode having a protuberance at a tip thereof, and a frequency controlling unit operable to vary a frequency of the alternating current without dependency on operating data that varies with an elapsed lighting time of the high-pressure discharge lamp.

Here "protuberance" is used to mean a part formed during the high-pressure discharge lamp manufacturing process, particularly during an aging process in the manufacturing process, and during an initial lighting period of the finished product (the first 100 hundred hours of lighting or less). Further, "operating data that varies as a lighting time elapses" is used to mean measurable operating data that alters with an elapsed lighting time of the high-pressure discharge lamp. Such data includes high-pressure discharge lamp voltage values, current values, luminance values of the optical device, the electrode gap distance (arc length), and the temperature of the arc tube, (particularly the temperature of the upper part of the arc tube that is the operating temperature).

Here, the frequency controlling unit may vary the frequency during a predetermined period in a regular or irregular manner without dependency on the operating data, and may repeat the predetermined period consecutively or intermittently.

Here, the frequency controlling unit may vary the frequency continuously during the predetermined period.

Here, the frequency controlling unit may switch the frequency intermittently among two or mom values during the predetermined period.

Here, the predetermined period may include one or more variable periods during which the frequency is varied continuously and one or more fixed periods during which the frequency is fixed.

Here, the frequency controlling unit may alternate a variable period and a fixed period, varying the frequency continuously during the variable period without dependency on the operating data, and fixing the frequency during the fixed period.

Here, the frequency controlling unit may switch the frequency intermittently among two or more different values.

Here, the frequency controlling unit may constantly vary the frequency in a regular or irregular manner without dependency on the operating data.

Here, the frequency may be varied between a predetermined maximum frequency and a predetermined minimum frequency that is at least 70 Hz.

The present invention further includes a high-pressure discharge lamp apparatus having: a high-pressure discharge lamp having an are tube in which a halogen material is enclosed and a pair of electrodes is disposed, each electrode having a protuberance at a tip thereof; and the high-pressure lamp lighting device.

Moreover, the present invention further includes a projector-type image display apparatus including the high-pressure discharge lamp apparatus.

Moreover, the present invention further includes a high-pressure discharge lamp lighting device having: a lighting circuit operable to supply an alternating current to a high-pressure discharge lamp to cause lighting, the high-pressure discharge lamp having an are tube in which a halogen material is enclosed and a pair of electrodes is disposed, and each electrode having a protuberance at a tip thereof and a frequency controlling unit operable to vary a frequency of the alternating current in a regular or irregular manner during a predetermined period, and repeat the predetermined period consecutively or intermittently.

Here, the frequency controlling unit may vary the frequency continuously during the predetermined period.

Here, the frequency controlling unit may switch the frequency intermittently among two or more values during the predetermined period.

Here, the predetermined period may include one or more variable periods during which the frequency is varied continuously and one or more fixed periods during which the frequency is fixed.

The present invention further includes a high-pressure discharge lamp lighting device having: a lighting circuit operable to supply an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling unit operable to alternate a variable period and a fixed period, the frequency controlling unit varying a frequency of the alternating current continuously according to a predetermined rule in the variable period, and fixing the frequency in the constant period.

Moreover, the present invention further includes a high-pressure discharge lamp lighting device having: a lighting circuit a lighting circuit operable to supply an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling unit operable to constantly vary a frequency of the alternating current according to a predetermined rule.

Moreover, the present invention further includes a high-pressure discharge lamp lighting method having: a lighting step of supplying an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling step of varying a frequency of the alternating current without dependency on operating data that varies with an elapsed lighting time of the high-pressure discharge lamp.

Here, in the frequency controlling step, the frequency may be varied during a predetermined period in a regular or irregular manner without dependency on the operating data, and the predetermined period may be repeated consecutively or intermittently.

Here, in the frequency controlling step, a variable period and a fixed period may be alternated, the frequency being varied continuously during the variable period without dependency on the operating data, and being fixed during the fixed period.

Here, in the frequency controlling step, the frequency may be switched intermittently among two or more different values.

Here, in the frequency controlling step, the frequency is varied in a regular or irregular manner without dependency on the operating data.

The present invention further includes a high-pressure discharge lamp lighting method having: a lighting step of supplying an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling step of varying a frequency of the alternating current in a regular or irregular manner during a predetermined period, and repeat the predetermined period consecutively or intermittently.

Moreover, the present invention includes a high-pressure discharge lamp lighting method having: a lighting step of supplying an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling step of alternating a variable period and a fixed period, the frequency controlling unit varying a frequency of the alternating current continuously according to a predetermined rule in the variable period, and fixing the frequency in the constant period.

Moreover, the present invention includes a high-pressure discharge lamp lighting method having: a lighting step of supplying an alternating current to a high-pressure discharge lamp to cause lighting, the high-pressure discharge lamp having an arc tube in which a halogen material is enclosed and a pair of electrodes is disposed, and each electrode having a protuberance at a tip thereof; and a frequency controlling step of constantly varying a frequency of the alternating current according to a predetermined rule.

According to the present invention, it is possible to provide a high-pressure discharge lamp lighting device, a high-pressure lamp device, a projection type image display device and a high-pressure discharge lamp lighting method all of which are capable of improving a life that is determined as the period before a certain drop in luminance, and of maintaining over the life the stability of properties such as the subtle variation of color reproduction and brightness.

Further, variation in the luminance caused by variation in the form of the protuberances of the electrode tips during constant lighting is suppressed, enabling a previously unreachable life of the order of 3000 hours or more to be achieved. Consequently, the life will be limited by other factors, such a drop in transparency due to clouding of the lamp casing tube or a drop in transparency due to deformation of the lamp casing tube.

BRIEF DESCRIPTION OF THE DRAWINGS

FIG. 6 includes a lower graph and an upper graph; the upper graph shows the temporal variation of the wave form of a square-wave alternating current; the lower graph corresponds to the upper graph and shows the temporal variation of the frequency of the square wave alternating current;

FIG. 8 is a table showing luminance transition results from a lighting test;

FIG. 9 is a table showing voltage transition results from a lighting test;

BEST MODE FOR CARRYING OUT THE INVENTION

First Embodiment

An embodiment of the invention is described in detail below with reference to the drawings.

1. Structure of a High-Pressure Mercury Lamp

As one example of a high-pressure discharge lamp, the structure of a high-pressure mercury lamp is described below.

Figure 1:
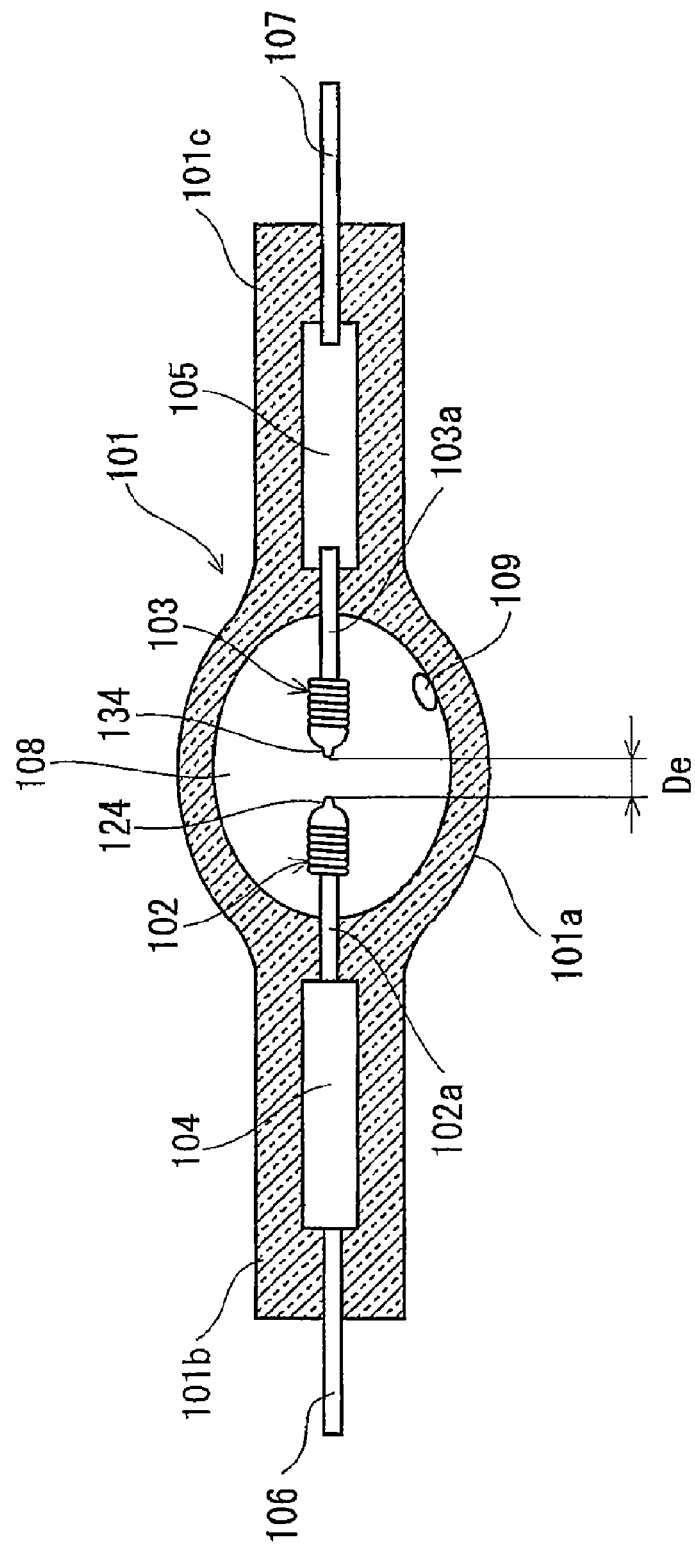
FIG. 1 shows a general structure of a high-pressure mercury lamp 100.

FIG. 1 shows a general structure of a high-pressure mercury lamp 100 with a 130 W power rating (hereinafter referred to as "the lamp").

As shown in FIG. 1, an arc tube 101 has an external casing manufactured from quartz glass, and includes an emission section 101a and seal sections 101b and 101c that are provided at the ends of the emission section 101a.

The emission section 101a is of a substantially spheroidal form, and encloses, in an internal discharge space (a light emission space) 108 thereof mercury 109 that is a light emitting material, an inert gas such as argon (Ar), Krypton (Kr), Xenon (Xe), or the like, and for aiding start-up, a halogen material such as Iodine (I), Bromide (Br), or the like. Further, inside the emission section 101a, a pair of tungsten (W) electrodes 102 and 103 are disposed substantially opposite one another.

The quantity of enclosed mercury 109 is set to be in a range of 150 mg/cm$^3$ to 650 mg/cm$^3$ per unit volume inclusive in the arc tube 101, and the pressure of the inert gas when the lamp is cool is set to be a range of 0.01 MPa to 1 MPa inclusive.

The halogen material has a function of returning tungsten caused to evaporate from the electrodes 102 and 103 due to the high temperature when the lamp 100 is operating to the electrodes 102 and 103 in a process known as the halogen cycle. In order to make the cycle function effectively, it is desirable that the quantity of enclosed bromide is in a range of $1*10^{-10}$ mol/cm$^3$ to $1*10^{-4}$ mol/cm$^3$ inclusive, and preferable that it is in a range of $1*10^{-9}$ mol/cm$^3$ to $1*10^{-5}$ mol/cm$^3$ inclusive.

The gap between the tips of the electrodes 102 and 103, which is the electrode gap distance De, is set in a range of 0.5 mm to 2.0 mm inclusive. Note that the electrodes 102 and 103 of the embodiment already have protuberances 124 and 134 formed to a certain extent at the completion of manufacture, and the electrode gap distance De is therefore the gap between the tips of the protuberances 124 and 134.

The electrodes 102 and 103 (102a and 103b) are electrically connected to external molybdenum leads 106 and 107 via pieces of molybdenum foil 104 and 105, and the external molybdenum leads 106 and 107 respectively extend from an end surface of each of the seal sections 101b and 101c to the exterior of the arc tube 101.

2. Structure of Lamp Unit

Figure 2:
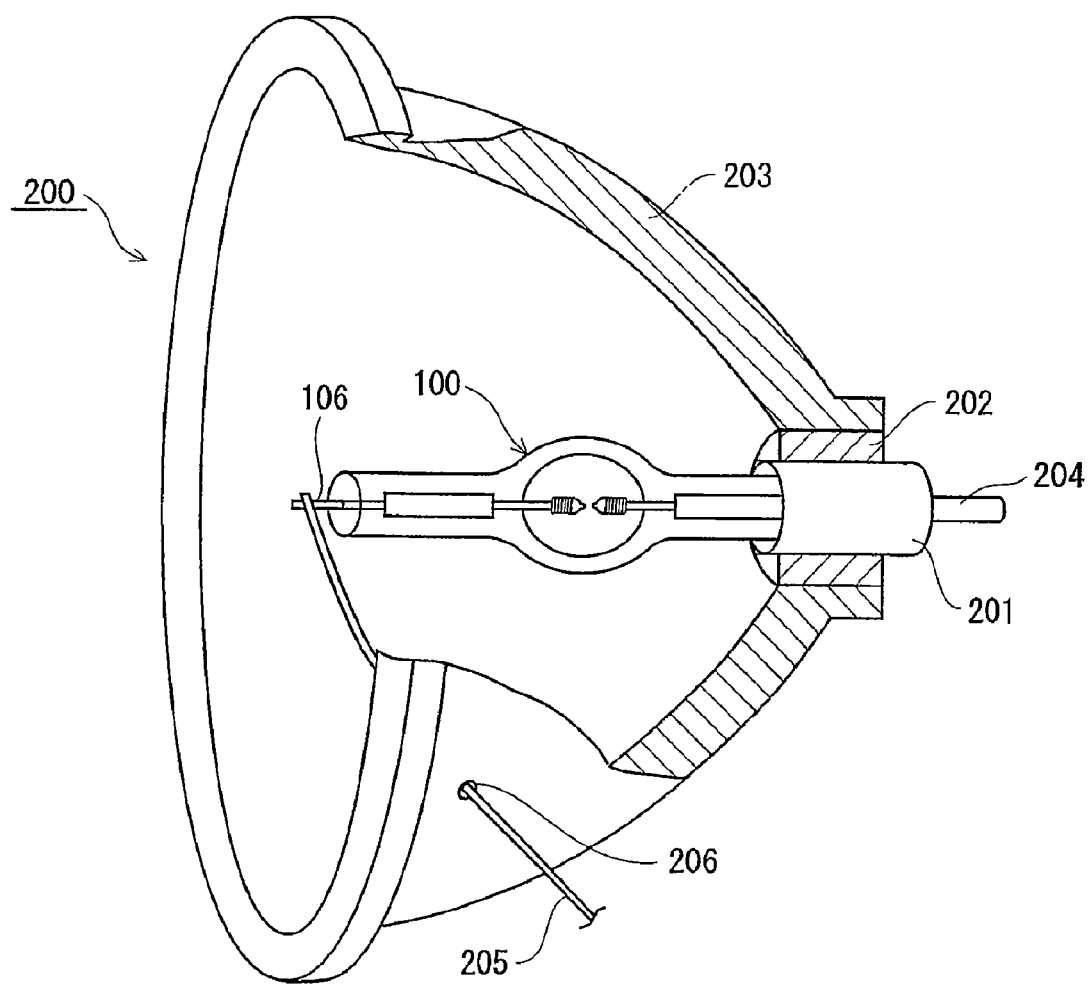
FIG. 2 is perspective view with a cut-away section and shows the structure of a lamp unit 200 in which the high-pressure mercury lamp 100 is used.

FIG. 2 is perspective view with a cut-away section and shows the structure of part of the lamp unit (a high-pressure discharge lamp apparatus) 200.

The lamp unit 200 includes the lamp 100 and a high-pressure discharge lamp lighting device (not shown in FIG. 2) for causing the lamp 100 to light, and a concave mirror 203 as a reflector (a reflective material) for reflecting light emitted from the lamp 100.

One end of the arc tube 101 (See FIG. 1) has a base 201 fitted to it, and the lamp 100 is fitted into the concave mirror 203 via a spacer 202. This fitting involves adjusting the components in such a way that the length direction central axis of the arc tube 101 and the optical axis of the concave mirror 203 are substantially aligned, and the position of the discharge arc of the lamp 100 substantially matches the focal point of the concave mirror 203.

Power is supplied to the lead 107 (see FIG. 1) of the base 201 side of the lamp 100 via a terminal 204. Power is supplied to the other lead 106 via a lead 205 that passes to the exterior through a hole 206 pierced through the concave mirror 203.

3. Structure of the Lighting Device

Figure 3:
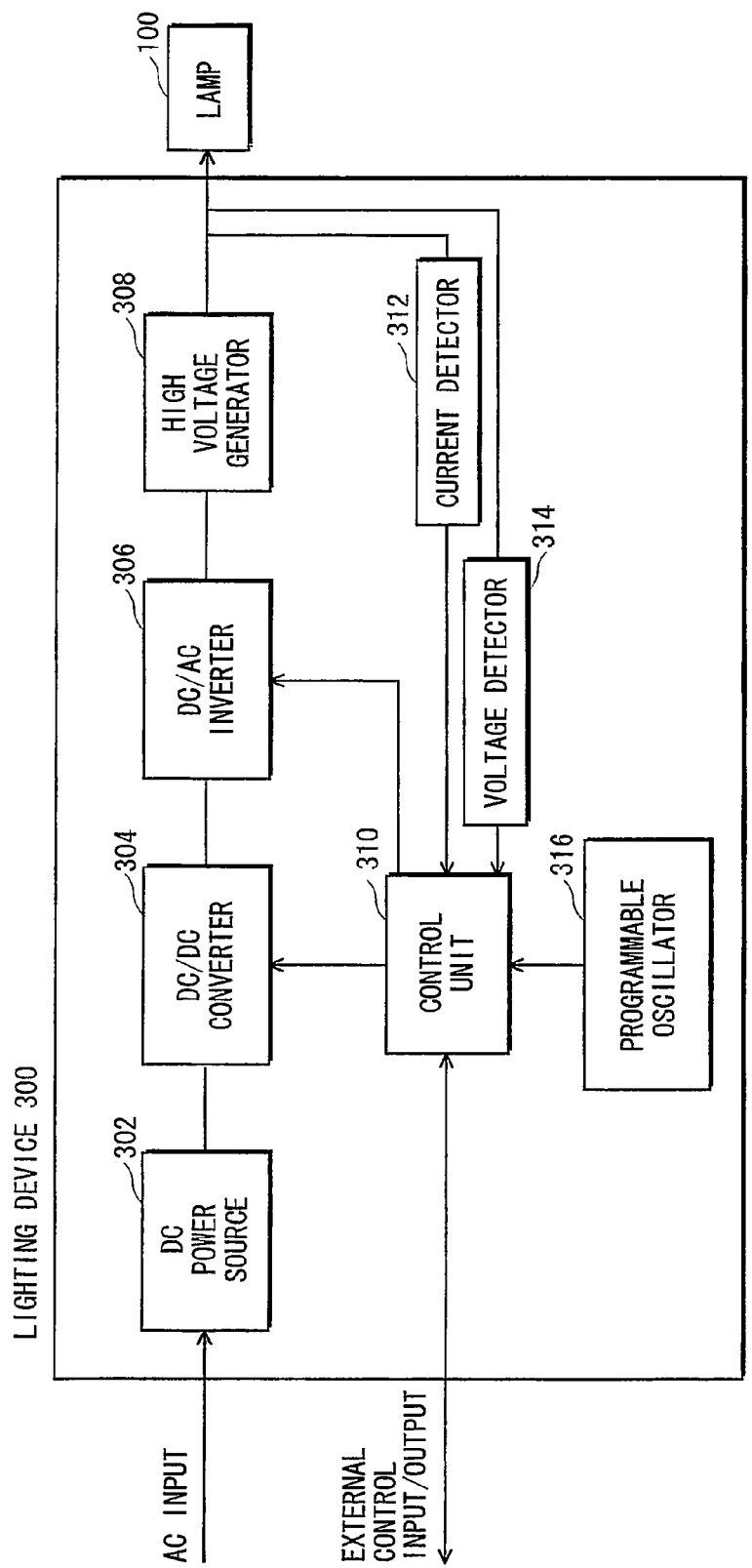
FIG. 3 is a block diagram showing the structure of a lighting device 300.

FIG. 3 is a block diagram showing the structure of a lighting device 300 that causes the lamp 100 to light.

As shown in FIG. 3, the lighting device 300 (high-pressure discharge lamp lighting device) is composed of a DC power source 302, a DC/DC converter 304, a DC/AC inverter 306, a high voltage generator 308, a control unit 310, a current detector 312, a voltage detector 314, and a programmable oscillator 316.

The DC power source 302 includes, for instance, a rectifying circuit, and generates direct current from domestic-use 100 V AC.

The DC/DC converter 304 supplies a direct current of a predetermined magnitude to the DC/AC inverter 306.

The DC/AC inverter 306 generates a square-wave alternating current of a predetermined frequency based on a control signal transmitted from the control unit 310, and transmits the generated square-wave alternating current to the high voltage generation device 308.

The high voltage generator 308 includes, for instance, a transformer, generates a high voltage, and applies the generated high voltage to the lamp 100.

The control unit 310 collectively controls elements such as the DC/DC converter 304, the DC/AC inverter 306.

The current detector 312 detects the current in the lamp 100, and the voltage detector 314 detects the voltage in the lamp 100.

The programmable oscillator 316 generates a square-wave alternating current of a predetermined frequency based on a predetermined program. With reference to this wave shape, the control unit 310 transmits control signals to the DC/AC inverter 306.

The frequency of the square-wave alternating current can be varied in a desired manner by altering settings values in the program.

When a lighting switch of the lamp 100, which is not shown in FIG. 3, is switched on, the lighting device 300 applies a high voltage pulse to the lamp 100. Subsequently, when dielectric breakdown occurs between the electrodes of the lamp 100 and an arc discharge current begins to flow between them, the current detector 312 transmits a detection signal to the control unit 310, and a lighting discrimination circuit in the control unit 310 judges that lighting has started.

After judging that lighting has started, the control unit 310 performs current control, keeping the current at a predetermined level until the voltage increases and the lamp 100 reaches its power rating. Then, when the voltage has reached a predetermined value, the control unit 310 switches over to rated power control. Namely, the control unit 310 compares a product of a current value detected by the current detector 312 and a voltage value detected by the voltage detection unit 314 with a power criterion value stored in the memory of the control unit 310, and controls the output current from the DC/DC converter 304 to give the predetermined power.

Note that the control unit 310 is connected to a switch for communicating with a control unit 402 (see FIG. 10) that is provided externally to the lighting device 300.

4. Sequence of Events Leading to the Invention of the Present Application

The invention of the present application was arrived at by an examination of results from lighting tests using a conventional technique of fixing the frequency of the square-wave alternating current flowing during lighting, and by an examination of a conventional technique for controlling the electrode tip protuberances, and these are described below in the stated order.

(1) Examination of Lighting Test Results when the Frequency was Fixed

The inventors set different values for the fixed frequency of the square-wave alternating current flowing during lighting in a number lamps 100, and performed lighting tests to investigate the temporal variation of a luminance sustain ratio and lamp voltage of each lamp 100.

These tests were performed with lamp units 200 equipped with lamps 100 with a rated power of 130 W, and the values of fixed frequency for the square-wave current flowing in the lamps during steady-state lighting were set to be 85 Hz, 170 Hz, 340 Hz and 510 Hz respectively.

Figure 4A:
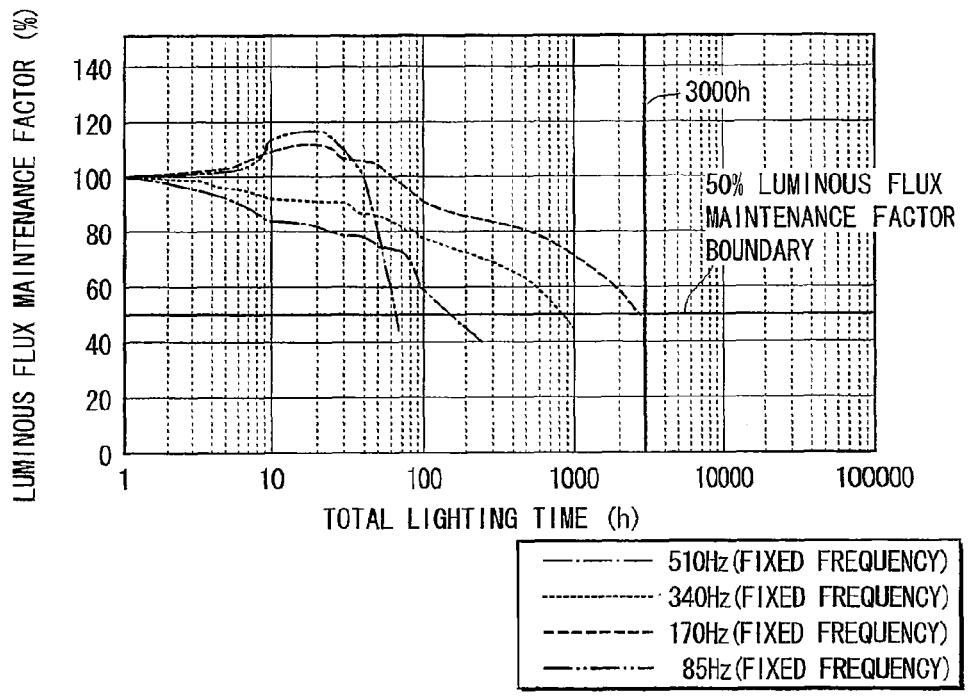
FIG. 4A is a graph showing relationships between accumulated lighting time and a luminance sustain ratio from lighting tests for which a conventional method was used.
Figure 4B:
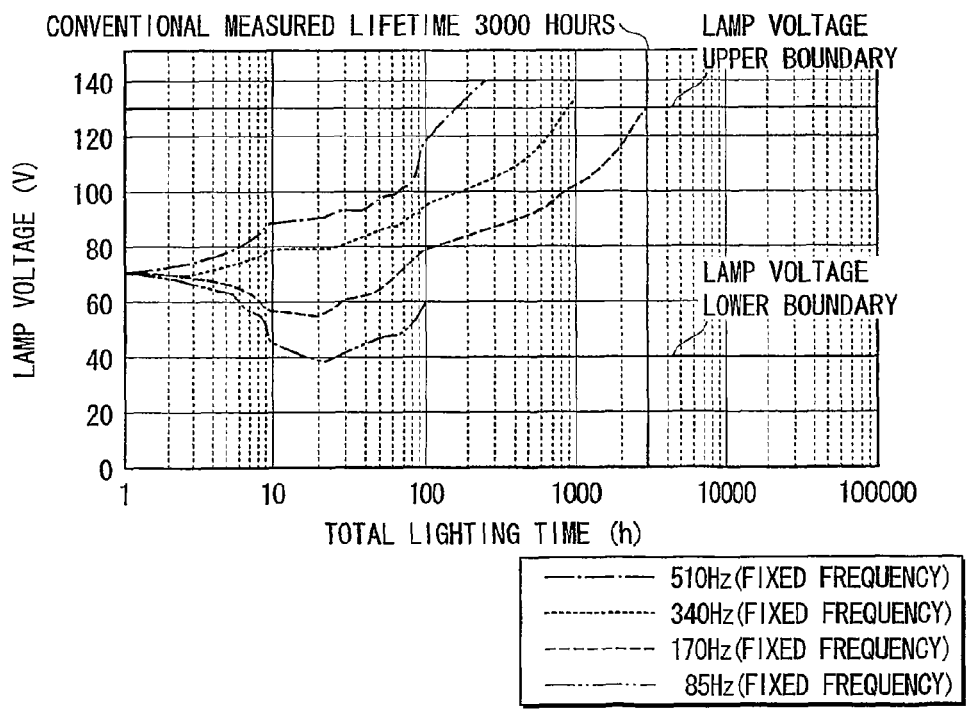
FIG. 4B is a graph showing relationships between accumulated lighting time and a lamp voltage from lighting tests for which a conventional method was used.

FIGS. 4A and 4B show graphs of these test results. In the tests, five lamps were used at each frequency, and the resultant average values from each set of five lamps were plotted in the graphs.

In the graph of FIG. 4A, the luminance sustain ratio is expressed as percentage of the luminance in an initial lighting period during which the luminance sustain ratio is said to be 100%. This measure of luminance is based on the ANSI lm measurement (ANSI lumen measurement the intensity of lighting projected onto screen by an optical system is measured at 9 predetermined points, and the ANSI lumen value appraised by calculating a luminous flux from the average intensity). Further, the graphs of FIG. 4 are semi-logarithmic with the total lighting time of the horizontal axis being expressed logarithmically. This is done to make it easier to see the dynamic variation during the initial stages of lighting.

As shown in the graph of FIG. 4, though the luminance of the lamp for which the fixed frequency was set to 85 Hz increased substantially immediately after lighting was begun, it peaked after approximately 20 hours of lighting and dropped sharply thereafter. This drop in luminance is caused by the electrode protuberances growing excessively and the internal wall of the are tube 101 blackening within a short period. Note that the lighting tests on the lamps for which the fixed frequency was 85 Hz were discontinued after the deterioration due to blackening became conspicuous.

The luminance values of the lamps for which fixed frequencies were set to 340 Hz and 510 Hz dropped immediately after the lighting began, and after 100 hours and before 1000 hours respectively, had fallen to a luminance sustain ration of 50%, the criterion for the life.

The luminance of the lamps for which the constant frequency was 170 Hz increased gradually immediately after lighting began, but after peaking at around 20 hours of lighting, it reduced gently, giving a life of approximately 3000 hours.

In the lighting tests, observation of the tips of the electrodes 102 and 103 of the lamp with the longest life for which the fixed frequency was 170 Hz revealed variation in the sizes of the protuberances 124 and 134 of the electrodes 102 and 103.

Figure 5A:
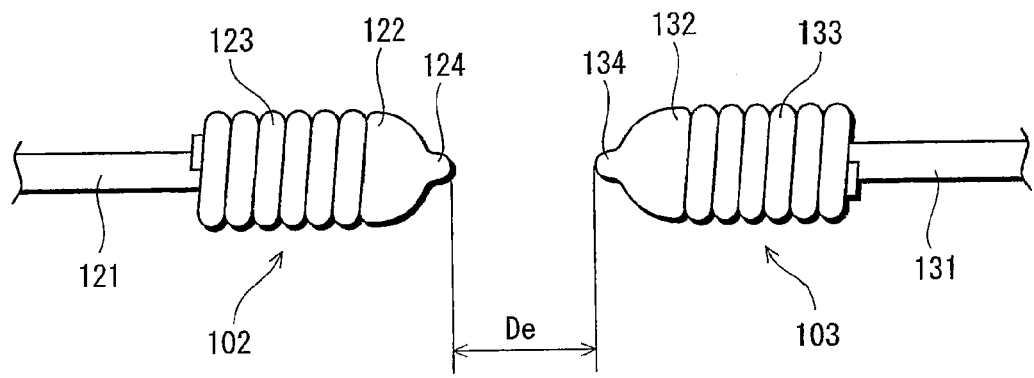
FIGS. 5A-5C are generalized diagrams showing variation of electrode protuberances over time in a lamp of the prior art using a fixed frequency of 170 Hz; 5A shows the form of the electrode protuberances before lighting begins; 5B shows the form of the electrode protuberances in the initial stages of the life; and FIG. C shows the form of the electrodes in the middle and latter stages of the life.
Figure 5B:
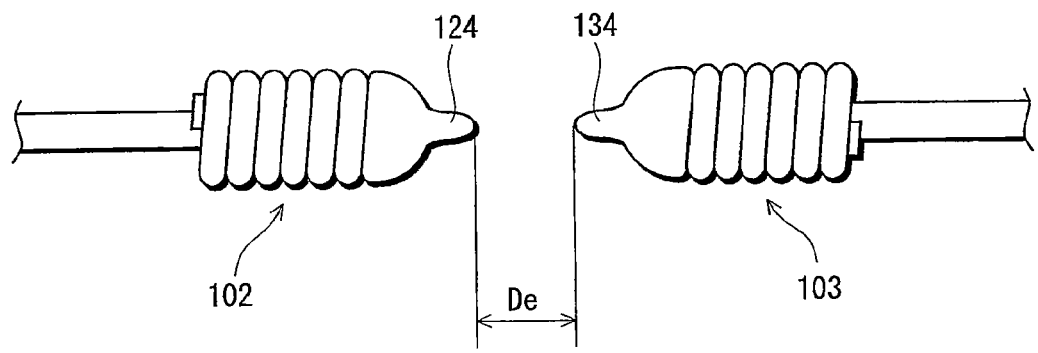
Figure 5C:
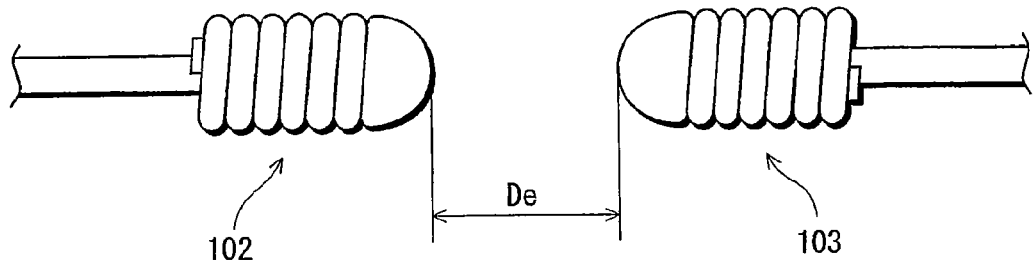

FIGS. 5A-5C are generalized diagrams showing temporal variation of the protuberances 124 and 134 of the electrodes 102 and 103 in a lamp 100 using a conventional fixed frequency of 170 Hz.

The electrodes 102 and 103 were obtained by (i) installing tungsten wire coils 123 and 133 at the tips of electrode axes 121 and 131, (ii) incorporating the tips of the electrode axes 121 and 121 and the coils 123 and 133 into the lamp 100, after first melting and processing a part of the coils to form the semi-spherical electrode tips 122 and 132, and (iii) forming the protuberances 124 and 134 on the electrode tips 122 and 132 by operating the lamp 100 by causing an alternating current of a prescribed frequency to flow for a prescribed period (see Japanese Laid-open Patent Application No. 2001-312997 for details). Note that parts that are "substantially spherical" may be used as the electrode tips.

As shown in FIG. 5A, before beginning the lighting test the protuberances 124 and 134 of the electrodes 102 and 103 were of an appropriate length. However, as shown in FIG. 5B, in the first few tens of hours after the beginning of lighting, the initial stages of the life, the protuberances 124 and 134 of the electrodes 102 and 103 grew excessively. Subsequently, as shown in FIG. 5C, in the middle and latter stages of the life (between 2000 and 3000 hours), the protuberances 124 and 134 of the electrode 102 and 103 were found to all but disappear. Note that FIG. 5C shows a general case in which the protuberances have entirely disappeared.

The causes of the excessive growth and disappearance of the protuberances 124 and 134 can be inferred as follows. As described above, a halogen material is contained inside the arc tube 101 of the lamp 100 in order to realize the halogen cycle. During lighting, when the tungsten that composes the electrodes 102 and 103 evaporates, it chemically combines with the halogen, and is returned by means of a convection current inside the are tube 101 to the arc plasma, where it dissociates from the halogen and becomes plasma ions. Having become plasma ions, the tungsten is attracted towards a region centered around the arc spot, which is the point of highest electric field concentration and is located at the cathodic phase-side electrode tip of the electrodes 102 and 103, where it accumulates. Then, when the cathodic phase-side electrode has reverted to its anodic phase, the temperature of the electrode tip increases due to colliding electrons, and the tungsten accumulated there during the cathodic phase once again evaporates.

If the balance between this accumulation and evaporation is maintained, the protuberances 124 and 134 at the tips of the electrodes 102 and 103 neither grow nor disappear, and they can be kept at an appropriate size. It follows that if this balance is not maintained the size of the protuberances 124 and 134 at the tips of the electrodes 102 and 103 will vary.

It is considered that that the protuberances 124 and 134 grew excessively in the initial stages of the life because large quantities of tungsten accumulated at the portions of the protuberances 124 and 134 that form the arc starting points.

Since the excessive growth of the protuberances 124 and 134 leads to a shortening of the electrode gap distance De, the lamp 100 makes a corresponding move towards being a point source, the condensing efficiency of the lamp 100 in combination with the concave minor 203 improves, and the luminance increases.

In the lighting test of the lamp using the fixed frequency of 170 Hz (see FIG. 4A), the luminance improved until approximately 20 hours after the beginning of lighting due to the shortening of the electrode gap distance.

Note that since the lamp has power control which maintains the rated power, as the electrode gap distance shortens the current value increases and the voltage value decreases. Thus, in the lighting tests, the voltage value was particularly low approximately 20 hours after the beginning of lighting because the electrode gap distance is short in this period.

Subsequently, in the middle and latter stages of the life, recrystallization of the electrodes 102 and 103 begins, and because the composition of the electrode 102 and 103 alters, it becomes more difficult for evaporated tungsten to return to the tips of the electrodes 102 and 103. Hence, the protuberances 124 and 134 shorten and ultimately disappear. Moreover, since tungsten continues to evaporate from the electrode tips 122 and 132 even after the protuberances 124 and 134 have disappeared, the electrode tips 122 and 132 are gradually eroded.

Since the disappearance of the protuberances 124 and 134 leads to a lengthening of the electrode gap distance De (the arc-length increases) and the lamp 100 gradually moves away from being an ideal point light source, the condensing efficiency of the lamp 100 in combination the reflecting minor 203 drops, and the luminance drops accordingly.

In the lighting test of the lamp for which the fixed frequency was 170 Hz (see FIG. 4A), the monotonic decline in luminance in the middle and latter stages of the life is caused by tips of the electrodes 102 and 103 eroding and the electrode gap distance lengthening.

(2) Examination of a Method to Control the Protuberances of the Electrode Tips

The problems with the prior-art method for controlling the protuberances of the electrode tips are as follows.

Firstly, a method for intentionally promoting growth in the protuberances at the manufacturing stage by selecting a fixed frequency of alternating current to be supplied is disclosed in Japanese Laid-open Patent Application No. 2001-312997. In this method, stable luminance during lighting is achieved by shortening the electrode gap distance through forming suitable protuberances, making a point light source. High-pressure mercury lamps currently in use are designed to actively support the growth of electrodes protuberances via the halogen cycle, and through forming these protuberances, to concentrate the arc discharge in order to give a higher lamp luminance.

Further, a method which enables the growth of protuberances to be suppressed in the initial stages of the life, which span between approximately 100 hours and 500 hours, by altering the fixed frequency of the supplied alternating current is disclosed in Japanese Laid-open Patent Application No. 2003-338394. According to this method, it is possible to suppress excessive generation of protuberances in the initial stages of the life, which span between approximately 100 hours and 500 hours, enabling a stable luminance to be achieved, and this method has therefore been used to solve this kind of problem.

Since this method of protuberance control during the life involves detecting the discharge voltage during normal driving of the lamp, frequency variation is not begun without there being fluctuation in the discharge voltage. Thus, with this method, frequency variation control is begun only after the state of the electrode tips of the lamp has altered from a state of initial use.

In other words, this is a method which depends on restoration control after the form of the protuberances has altered, and by which frequency variation control is carried out after protuberances have grown excessively in such a way that the protuberances that have grown are caused to evaporate and the electrodes are returned to their original state.

One of the problems with this method is that it is difficult to effectively control the process of slow reduction with driving time in the size of the electrode protuberances. In the method of the prior art, control of this process is performed based on lamp operating data values which alter over time, such as the lamp voltage. However, if the operating data being detected alter slowly, it is difficult to control this process effectively. Moreover, since the electrical properties of the lamp gently change with the elapsed driving time, the optimum conditions for controlling the growth and reduction of the protuberances also change. Thus, the driving frequency, control period and other control conditions, which have been set in the initial period for the purposes of control, sometimes deviate from the optimum conditions. Hence, the problem arises that the protuberances cannot be effectively controlled by means of the method of protuberance control during the life.

In the invention, to tackle this problem, the frequency of the alternating current supplied to the lamp is constantly varied without referring to the lamp operating data values that alter with the elapsed lighting time of the lamp, and the electrode protuberances are thereby stabilized in their manufactured form, enabling the life to be extended.

It is clear from experiments that the optimum conditions for facilitating the growth and disappearance of the protuberances of the electrode tips vary according to such factors as the conditions of lamp design and, when steady-state lighting takes place, the accumulated lighting time. In view of this, an experiment in which the operable frequency was constantly varied was attempted, and it was found that varying the frequency in this way had the effect of maintaining the initial form of the electrodes.

5. Illumination Method of the Embodiment

FIG. 6 shows the square-wave alternating current generated by the lamp lighting device of the embodiment. The upper graph shows the variation of the square-wave alternating current with time. The lower graph corresponds to the upper graph and shows the variation of the frequency of the square-wave alternating current with time.

In the embodiment, during steady-state lighting the square-wave alternating current frequency is switched in steps to each of 340 Hz, 255 Hz, 170 Hz, 128 Hz, and 85 Hz respectively, the switching taking after each square wave cycle.

When the frequency has been reduced in steps from the maximum frequency of 340 Hz to the minimum frequency of 85 Hz, it once again increases in steps to 340 Hz, and this frequency switching is repeated.

As shown in FIG. 6, the repeated frequency switching cycle is called a variable cycle. During lighting, the frequency switching in the variable cycle is repeated periodically. Note that this variable cycle has a period of approximately 50.0 ms.

Illumination tests resembling those described above but making use of the lamp lighting method of the invention were performed.

Figure 7A:
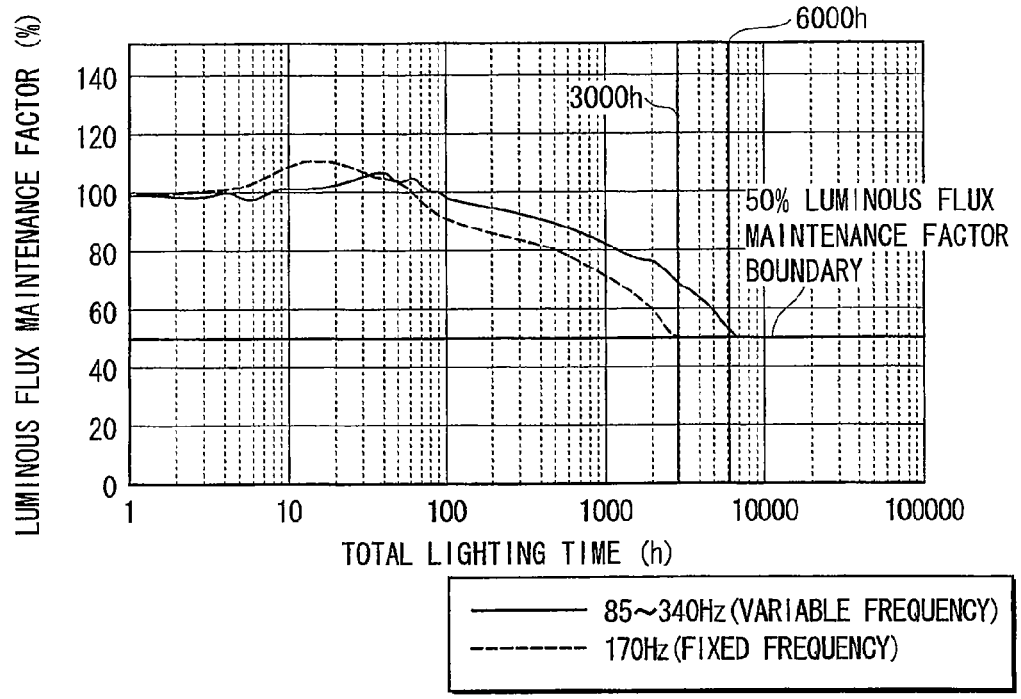
FIG. 7A is a graph showing relationships between accumulated lighting time and a luminance sustain ratio from lighting tests for which a conventional method was used.
Figure 7B:
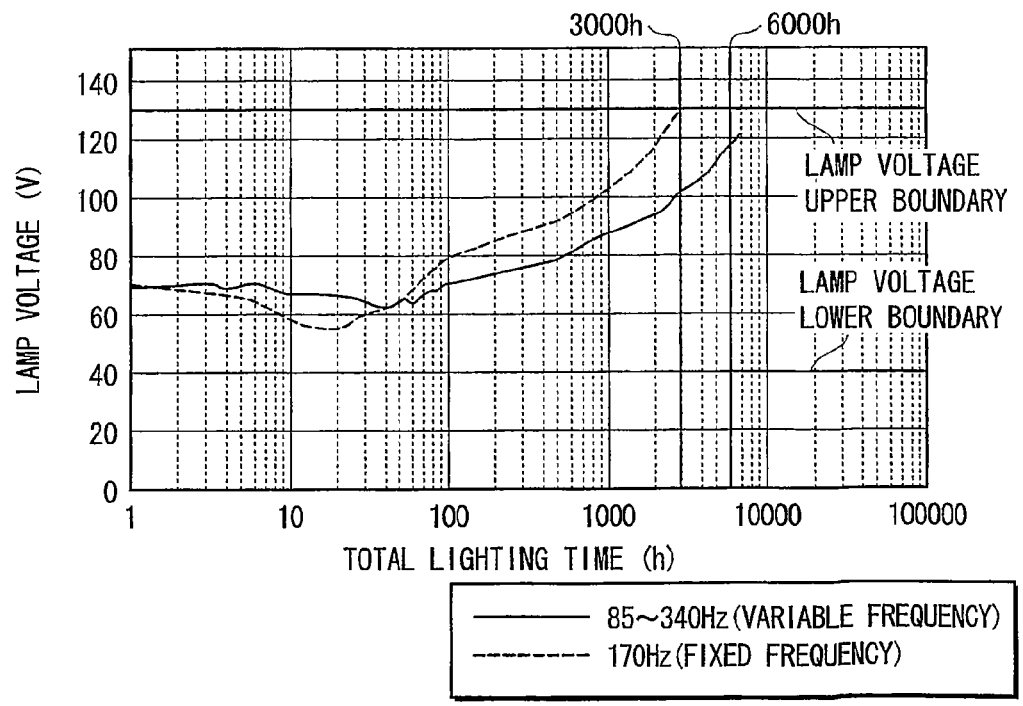
FIG. 7B is a graph showing relationships between accumulated lighting time and lamp voltage from lighting tests for which a conventional method was used.

FIGS. 7A and 7B show graphs of these test results. In the same figure, a plot for the 170 Hz fixed frequency method of the prior art is shown to facilitate comparison.

As shown in the graph of FIG. 7A, with the variable method of the embodiment in the initial stages of the life there is no increase in luminance of the kind seen with the fixed frequency method, and the luminance is substantially constant from the beginning of lighting until the 100 hour mark. A constant luminance over the life is generally demanded in lamps, and with the variable method it was possible to achieve a stability in luminance over the life which was greater than that of the prior art.

Further, it was seen that, with the variable method, the luminance decreased more gently in the middle and latter stages of the life than with the prior art, and that an extended life of more than 6000 hours could be realized.

It is thought that the life could be extended in this way with the lighting method of the present invention because it was possible, by maintaining the balance between the above-described accumulation and evaporation, to maintain the form of the protrusions 124 and 134 at the tip of the electrodes 102 and 103 in the initial state of first use for a longer period than with the prior art.

FIG. 8 and FIG. 9 are tables indicating the luminance transition and the voltage transition respectively from the above-described lighting tests.

Frequency Switching (1) In the embodiment, the frequency is not varied directly between 340 Hz and 85 Hz. There are the three frequencies of 255 Hz, 170 Hz, and 128 Hz between 340 Hz and 85 Hz, and the frequency is varied in steps, taking values of 340 Hz, 255 Hz, 170 Hz, 128 Hz, and 85 Hz respectively. This method is used because if the frequency is varied abruptly, square waves will sometimes distort due to the properties of lighting circuits. By varying the frequency in steps in this way it is possible to suppress distortion of the square wave.

(2) In the embodiment, the frequency is varied between 340 Hz and 85 Hz so as to straddle the 170 Hz frequency which, among the fixed frequencies, gave the longest life. It is thought that varying the frequency between values straddling 170 Hz, the optimal value in terms of life, enables the balance between accumulation and evaporation to be maintained better than with the prior art, and thereby enables the life of the lamp to be reliably extended. Here, "optimal in terms of life" is used to mean that in the first part of the life a luminous flux without any usage problems is obtained, and in addition, that the luminous flux maintenance factor does not fall for an extended period.

Which pattern should be chosen for varying the frequency of the square-wave alternating current during steady-state lamp lighting will vary depending on the make-up of the lamp (the volume of the arc tube, the composition of the materials contained in the tube, the electrode gap distance, and the like), and a suitable pattern can be determined by experiment.

(3) The Lower Limit of Frequency Variation

When the lamp 100 is being driven for steady-state lighting, a minimum frequency of several Hz can be used. However, if the minimum frequency of the flashing of the lighting device and projector display screen is 50 Hz or 60 Hz, the frequencies at which alternating current is supplied commercially, the display screen will appear to flash. In order to avoid such an undesirable state, the commercial frequencies must be avoided and, in order to do this, a minimum frequency of 60 Hz or more is required. Experiments show that, when the frequency is set 10 Hz above the commercial frequencies, such flashing reduces to the point where it is no longer noticeable. Hence, when a margin with respect to the current maximum commercial-use frequency has been taken into account, frequencies of 70 Hz or more can be selected as safe frequencies. Note that it has been confirmed that the protuberances at the electrode tip will grow at these frequencies.

(4) The Upper Limit of Frequency Variation

It has been confirmed that, when the 130 W lamp 100 is driven at 130 W, steady-state driving is possible at each of the fixed frequencies of 300 Hz, 400 Hz, 500 Hz, and 550 Hz. Experiments were also carried out with regard to other electrical conditions, and it was found that any frequency between 300 Hz and 500 Hz inclusive could be used as the maximum fixed frequency. Moreover, when variation among individual lamps was taken into consideration, the maximum frequency at which steady-state driving was possible also fell in the range of 300 Hz to 500 Hz inclusive. The electrode protuberances of the lamp were also assessed at this time. With this range of fixed frequencies, rather than growing, the electrode protuberances of the lamp are seen to tend to reduce in size. This is confirmed by the lamp discharge voltage data. In other words, at these frequencies, either the growth of the generated protuberances at the electrode tips is minimal, or the electrode gap distance increases.

(5) It is desirable that the maximum frequency to which the frequency is to be varied is at least 3 times the minimum frequency. This is because it is thought that if a difference of approximately this magnitude is established between the minimum and maximum frequencies, it is easier to maintain the electrode gap distance appropriately.

(6) In the embodiment, the frequency is switched among the three frequencies of 340 Hz, 170 Hz, and 85 Hz, but it may instead be switched between only two frequencies. When this is the case it is desirable, in order to the extend the period that the electrode gap distance is appropriately maintained beyond that of the prior art, to set the higher of the two frequencies to a frequency at which the electrode tips grow in the initial stages of the life, and to set the lower frequency to a frequency at which the electrode tips reduce in size in the initial stages of the life.

6. Image Display Device

The lamp unit 200 which is of the invention and which includes the lamp lighting device 300 can be applied in a projector-type image display device.

Figure 10:
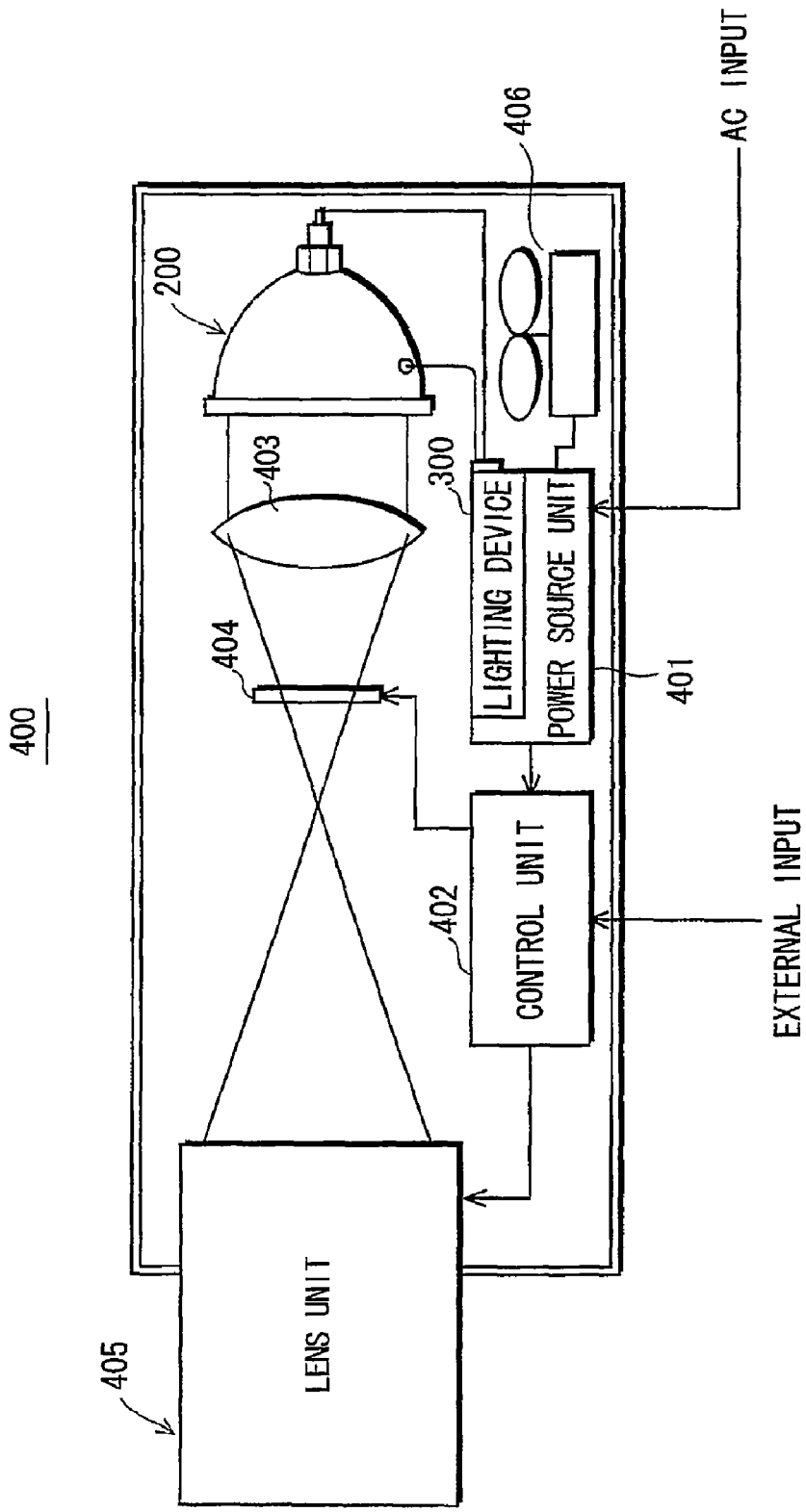
FIG. 10 is a block diagram showing the structure of a liquid crystal projector.

FIG. 10 is a schematic diagram showing the structure of a liquid crystal projector 400 using the above-described lamp unit 200, which is one example of such a projector-type image display device.

As shown in FIG. 10, the transmission-type liquid crystal projector 400 is composed of a power source unit 401, a control unit 402, a condenser lens 403, a transmission-type color liquid crystal display panel 404, a lens unit 405 which contains a driving motor, and a fan device 406 for cooling purposes.

The power source unit 401 transforms commercial-use AC input (100V) to a predetermined DC voltage, and supplies the DC voltage to the control unit 402.

The control unit 402 drives the color liquid crystal display panel 404, causing it to display color images based on image signals inputted from the exterior. Further, the control unit 402 controls the driving motor inside the lens unit 405, causing the lens unit 405 to execute focusing operations and zoom operations.

Light irradiated from the lamp unit 200 is condensed by the condenser lens 403, and transmitted through the color liquid crystal display panel 404, which is disposed in the optical path, and the image formed on the liquid crystal display panel is thereby projected through the lens unit 405 and onto a screen not shown in FIG. 10.

Using a lamp unit which has a longer life than those of the prior art and which is composed of the high-pressure mercury lamp and lighting device of the present invention enables a liquid crystal projector of great commercial value can be provided.

Note that the lamp unit 200 which includes the lamp lighting device 300 of the invention can be applied in other projector-type image display devices, such as DLP (registered trademark) style projectors that use DMPs (digital micro-mirror devices), liquid crystal projectors that use other reflection-type liquid crystal components, and the like.

7. Modifications

Though the embodiment has been described above, the invention is not of course limited to the above-described embodiment and suitable modifications are possible provided they do not depart from the scope of the invention.

(1) Various modifications of the pattern for switching the frequency of the square-wave alternating current are conceivable. FIG. 11 through FIG. 15 show examples of such modifications. These figures all show the patterns in the same manner as the upper graph of FIG. 6.

Figure 11:
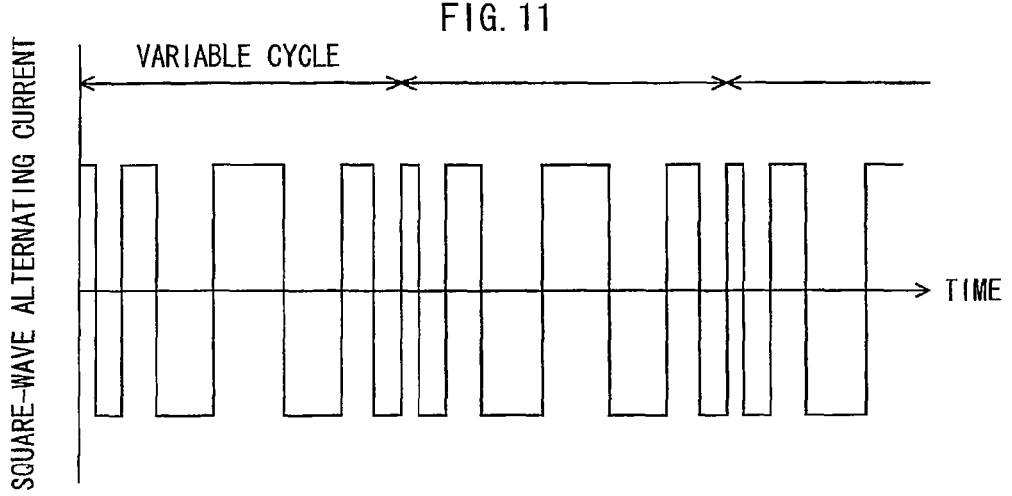
FIG. 11 shows the temporal variation of the wave form of the square-wave alternating current for a modified example.

The switching pattern of FIG. 11 resembles those of the First Embodiment in that when the frequency has been reduced in steps from a maximum frequency to a minimum frequency it is once again increased in steps to the maximum frequency, but differs in that the frequency is switched every square-wave half-period. For example, in one variable cycle, the frequency will be switched every square-wave half-period, taking in turn values of 340 Hz, 255 Hz, 170 Hz, 128 Hz, 85 Hz, 128 Hz, 170 Hz and 255 Hz.

Figure 12:
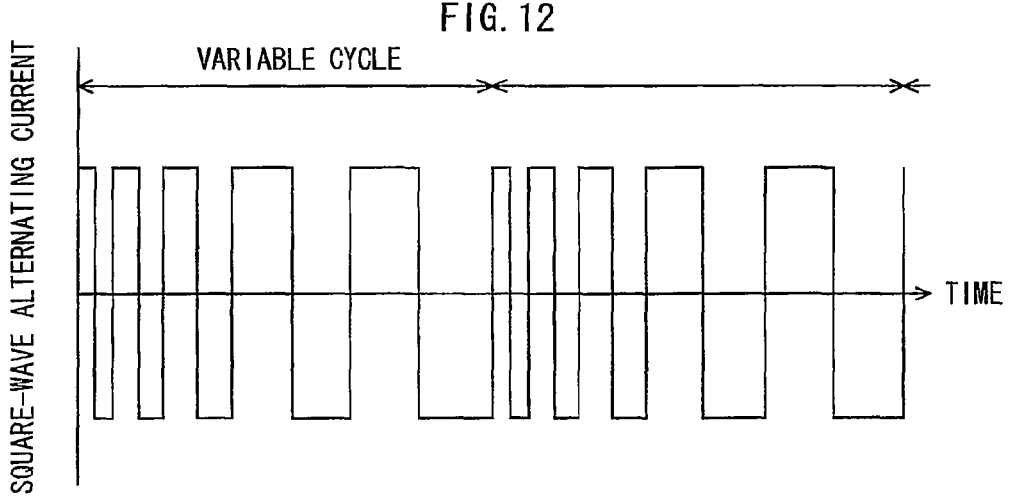
FIG. 12 shows the temporal variation of the wave form of the square-wave alternating current for a modified example.

In the switching pattern of FIG. 12, one variable cycle is a period over which the frequency is switched from the maximum frequency to the minimum frequency in steps, a switching step taking place every full square-wave period. For example, in one variable cycle, the frequency will be switched every full square-wave period, taking in turn values of 340 Hz, 255 Hz, 170 Hz, 128 Hz, and 85 Hz.

Figure 13:
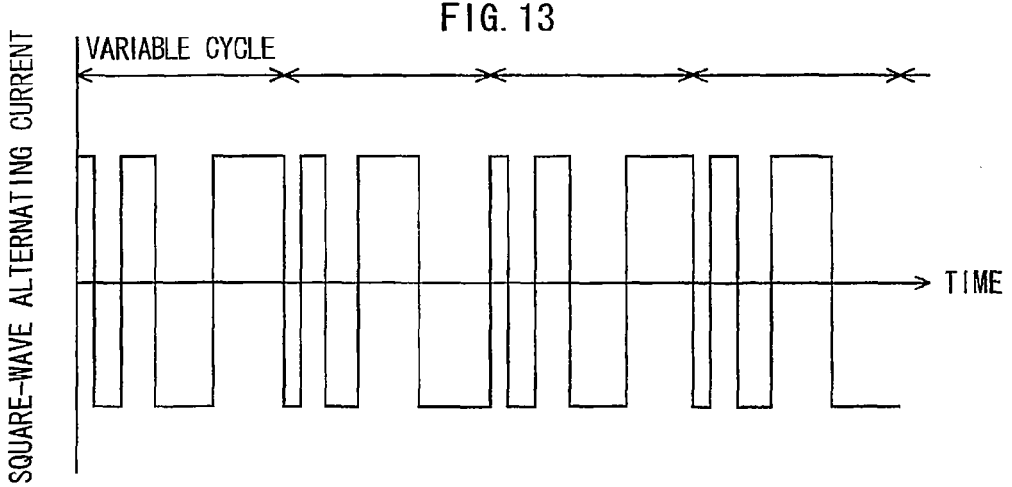
FIG. 13 shows the temporal variation of the wave form of the square-wave alternating can for a modified example.

In the switching pattern of FIG. 13 the frequency is switched from the maximum frequency to the minimum frequency, a switching step taking place every square-wave half-period. For example, in one variable cycle the frequency will be switched every square-wave half-period, taking in turn values of 340 Hz, 255 Hz, 170 Hz, 128 Hz, 85 Hz, 128 Hz, 170 Hz and 255 Hz.

Figure 14:
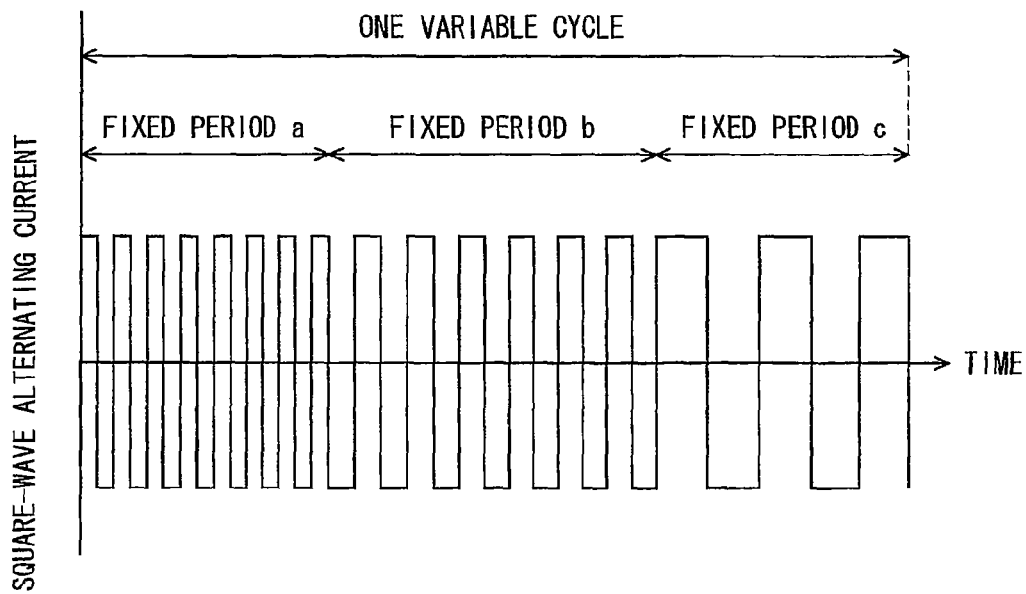
FIG. 14 shows the temporal variation of the wave form of the square-wave alternating current for a modified example.

In the switching pattern of FIG. 14, one variable cycle is a period over which the frequency is switched at regular intervals and in turn to the three frequencies of the frequency fixed periods a, b, and c. For example, the fixed frequency of fixed period a may be 340 Hz, the fixed frequency of fixed period b may be 170 Hz, and the fixed frequency of fixed period c may be 85 Hz.

Figure 15:
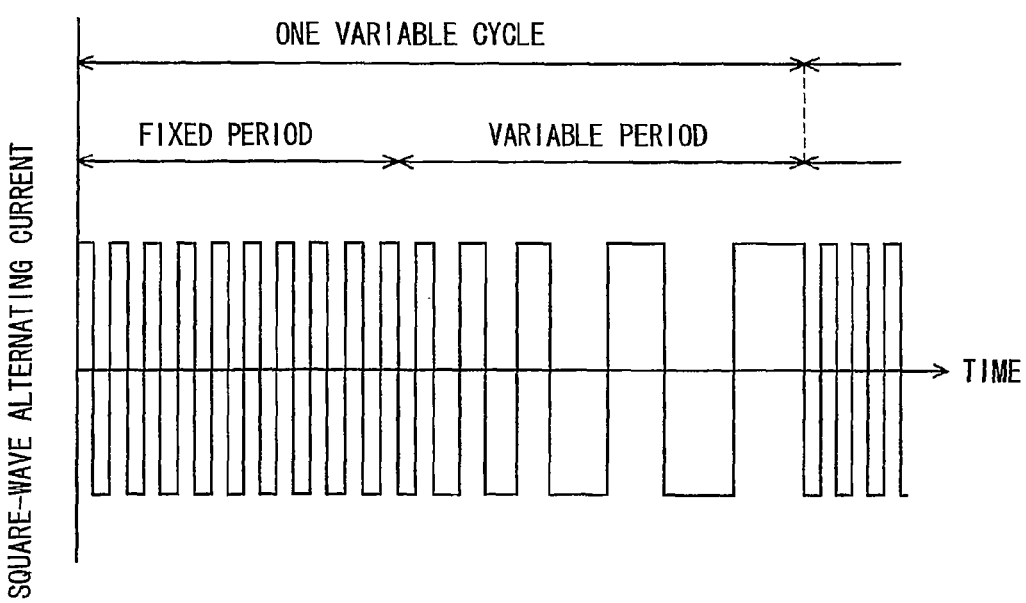
FIG. 15 shows the temporal variation of the wave form of the square-wave alternating current for a modified example.

In the switching pattern of FIG. 15, one variable cycle is a period over which fixed periods for which the frequency is fixed alternate with variable periods for which the frequency is varied. For example, one variable cycle may be composed of two periods, the first being a fixed period with a fixed frequency of 340 Hz, and the second being a variable period during which frequency switching similar to that of the variable cycle shown in FIG. 12 is carried out.

(2) In the embodiment, the frequency was varied intermittently, but it is acceptable to vary the frequency continuously.

Figure 16:
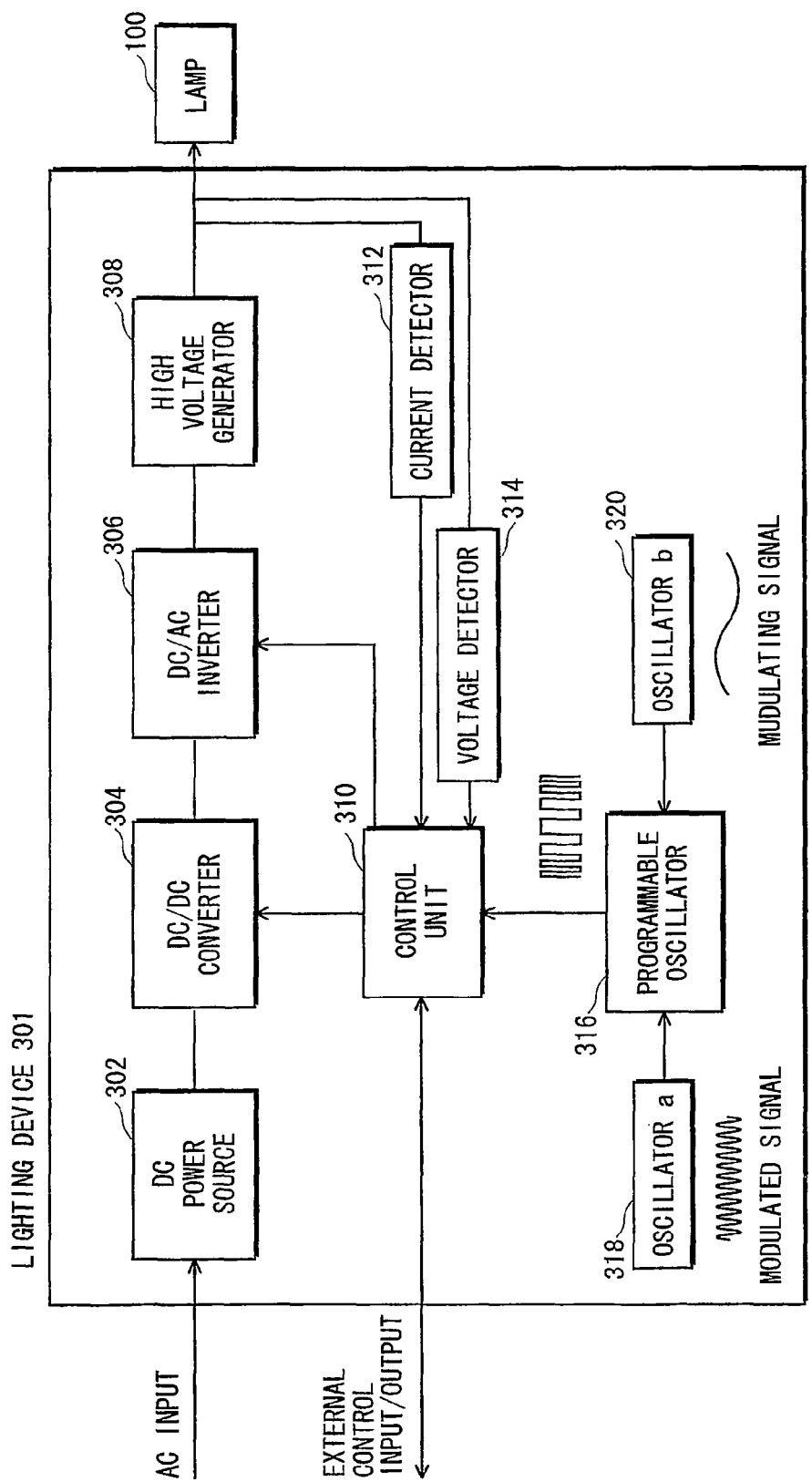
FIG. 16 is a block diagram showing the structure of the lighting device 301 for a modified example.

An lighting device for realizing continuous variation of the frequency is described below. FIG. 16 is a block diagram showing the structure of a lighting device 301 of a modified example. Since the lighting device 301 shown in FIG. 16 has a structure that is fundamentally the same as the lighting device 300 of the embodiment (see FIG. 3), the description below is centered on those aspects that differ.

The oscillator 318 generates a modulation signal and the oscillator 320 generates a modulating signal.

The frequency determining circuit 316 modulates the modulation signal using the modulating signal and generates a modulated square wave.

The control unit 310 makes reference to the square wave, and transmits the predetermined control signal to the DC/AC inverter 306.

With this kind of lighting device 301, the frequency of the square wave alternating current supplying the lamp can be varied constantly using a simple circuit structure, and it is possible to finely control this frequency variation.

Note that instead of the frequency determining circuit 316 and the oscillators 318 and 320, one of the known frequency modulation circuits may be used.

(3) Various other modified examples are conceivable for the frequency variation. These modified examples are shown in FIG. 17 through FIG. 20. The graphs of FIG. 17 through FIG. 20 all have time (t) plotted on the horizontal axis and frequency (f) plotted on the vertical axis, and indicate the variation of time with frequency.

(A) Regular Variation and Irregular Variation

Figure 17:
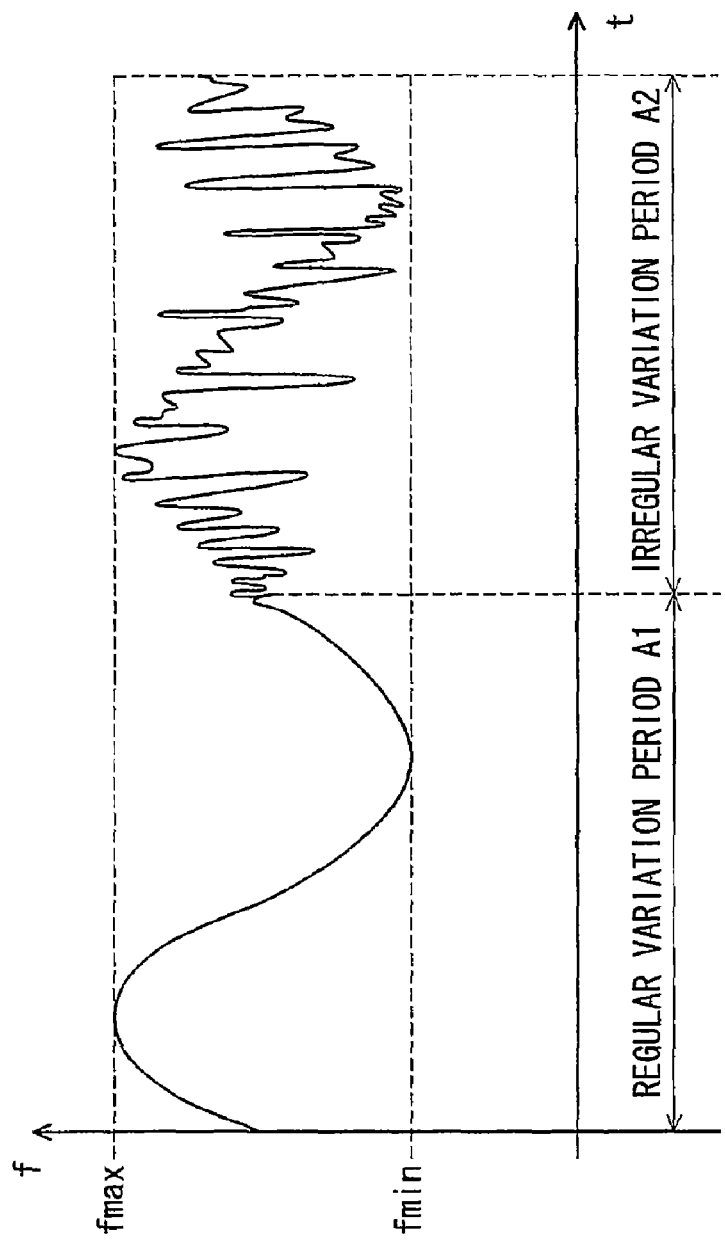
FIG. 17 shows the temporal variation of the frequency of the square-wave alternating current for a modified example.

The frequency may be varied regularly, which is to say according to some predetermined rule, or be varied irregularly. The graph of FIG. 17 shows regular variation and irregular variation in a conceptual way. As shown in FIG. 17, whereas the frequency variation in period $A_1$ is regular, the frequency variation in period $A_2$ is irregular. Note that, while the frequency variation in the period $A_2$ is irregular, a maximum frequency (f max) and a minimum frequency (f min) are defined, and the frequency is varied between these two.

(B) Intermittent Variation and Continuous Variation

The frequency may be varied intermittently, or varied continuously, which is to say constantly. The graphs of FIG. 18A and FIG. 18B show intermittent variation and continuous variation in a conceptual manner.

Figure 18A:
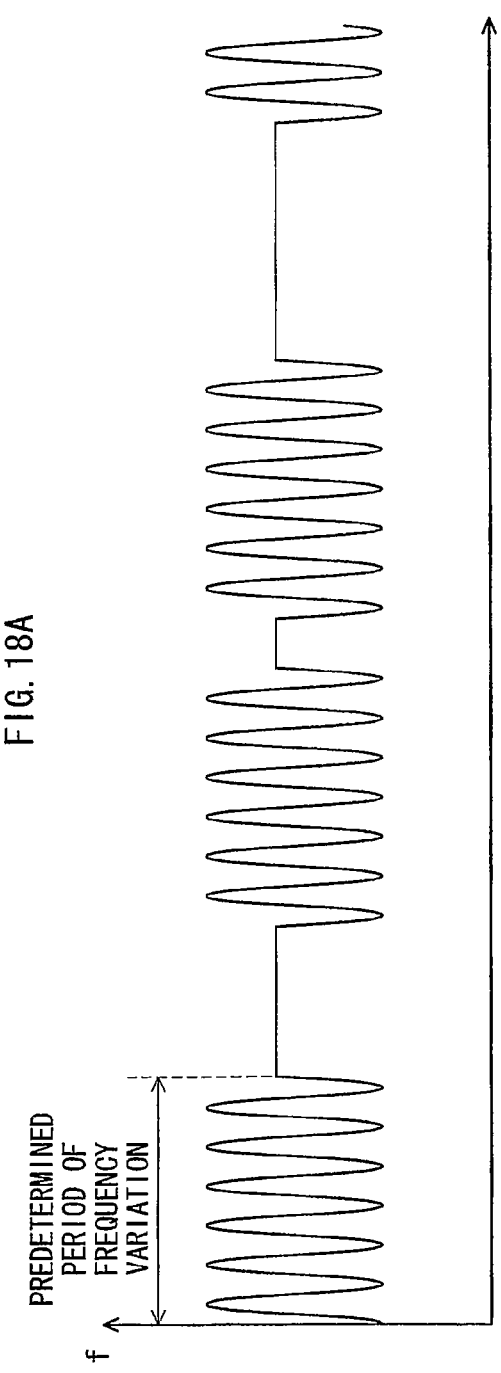
FIG. 18 shows the temporal variation of the frequency of the square-wave alternating current for a modified example.

In the graph of FIG. 18A, a predetermined period of frequency variation is followed by a period of fixed frequency, and subsequently by further predetermined periods of frequency variation interspersed with further fixed frequency periods.

Figure 18B:
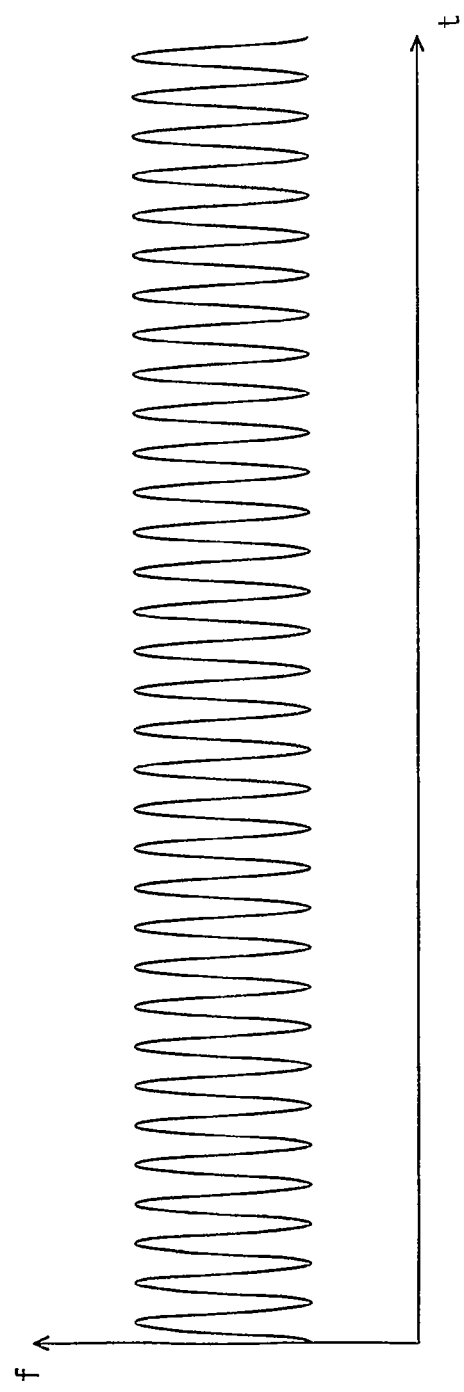

In the graph of FIG. 18B, on the other hand, the frequency is varied continuously.

(C) Combination of Intermittent and Continuous Variation

Figure 19:
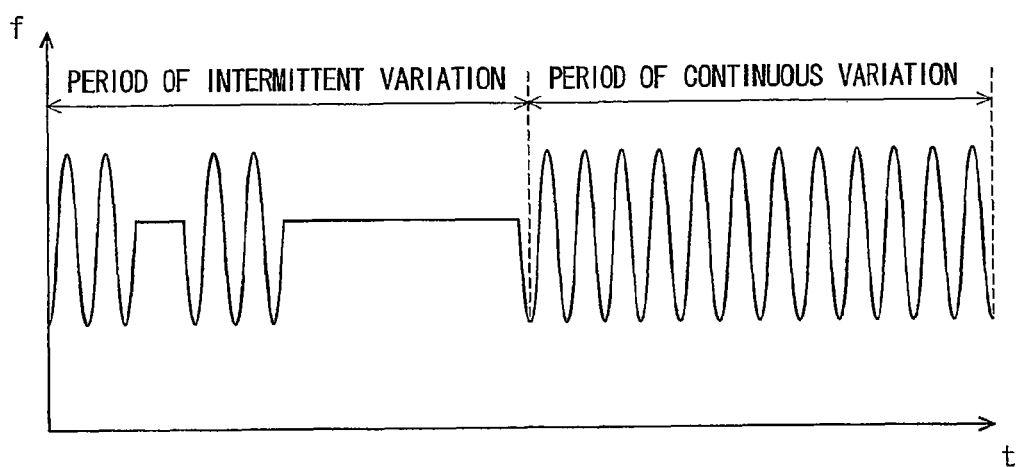
FIG. 19 shows the temporal variation of the frequency of the square-wave alternating current for a modified example.

Periods of the intermittent variation and continuous variation described in (B) above may be combined. For example, periods of intermittent variation and periods of continuous variation may be alternated, as shown in FIG. 19.

(D) Grouping of Periods of Variation and Periods of Fixed Frequency

Though not specifically shown in the drawings, a period including one or more periods of continuous frequency variation and one or more periods of fixed frequency may form one cycle, and this cycle may be repeated. For example, a period of continuous variation and a subsequent period of fixed frequency may be grouped and treated as a single cycle, and this cycle repeated.

(E) Irregular Repetition

Figure 20:
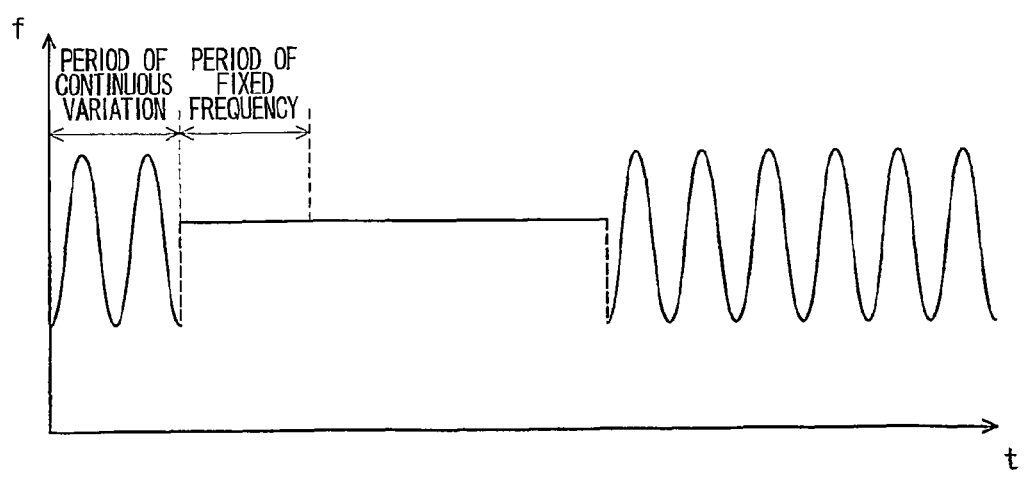
FIG. 20 shows the temporal variation of the frequency of the square-wave alternating current for a modified example.

As shown in the graph of FIG. 20, a period of continuous variation and a period of fixed frequency may be established, and these two periods repeated irregularly. This is to say that instead of an order being predetermined, which of the two periods is to follow a given period may be left unspecified.

(F) Combination with Frequency Variation that is Dependent on Operating Data (Such as Discharge Voltage Data).

In the description of (A) through (E) above, the combination of periods of frequency variation not dependent on the operating data and periods of fixed frequency has been described. However, instead of the periods of fixed frequency, it is acceptable to use periods during which the frequency is varied according to the operating data.

(4) It is possible, by applying a combination of the lighting method of the invention and a lighting method by which the lighting power is changed during steady-state lighting, to further suppress the reduction in transparency of the lamp are tube due to clouding, transformation and the like, enabling a longer life to be achieved.

This is because, by switching to a lower power (within a range of 60% to 95% of the rated power, for instance) the heat produced by the arc during lighting can be reduced, and clouding, transformations and the like in the are tube can be suppressed.

8. Additional Information

Though in the embodiment the example of a high-pressure mercury lamp containing mercury as a light emitting material was described, the invention can also be applied in other high-pressure discharge lamps, such as metal halide lamps and the like.

INDUSTRIAL APPLICABILITY

The high-pressure discharge lamp lighting device of the invention gives a longer life than the prior art and can therefore be applied in liquid crystal display devices and the like.

The invention claimed is:

1. A high-pressure discharge lamp lighting device comprising:
   a lighting circuit supplying an alternating current to a high-pressure discharge lamp to cause lighting, the high-pressure discharge lamp having an arc tube in which a halogen material is enclosed and a pair of electrodes is disposed, each electrode having a protuberance at a tip thereof, the protuberance formed through a halogen cycle; and
   a frequency controlling unit switching, during a continuous operation of the high-pressure discharge lamp, a frequency of the alternating current intermittently among two or more different values without dependency on operating data that varies with an elapsed lighting time of the high-pressure discharge lamp, wherein
   a maximum frequency of the alternating current is in a range of 300 Hz to 500 Hz inclusive, and is at least three times a minimum frequency of the alternating current.

2. The high-pressure discharge lamp lighting device of claim 1, wherein
   the lighting circuit repeats a cycle composed of (i) a first period for supplying the alternating current with a first fixed frequency and (ii) a second period for supplying the alternating current with a second fixed frequency that is different from the first fixed frequency.

3. The high-pressure discharge lamp lighting device of claim 2, wherein
   at least one of the first period and the second period is long enough to include a plurality of cycles of the corresponding fixed frequency.

4. A high-pressure discharge lamp apparatus, comprising:
   a high-pressure discharge lamp having an arc tube in which a halogen material is enclosed and a pair of electrodes is disposed, each electrode having a protuberance at a tip thereof; and
   pressure lamp lighting device of claim 1.

5. A projector-type image display apparatus comprising the high-pressure discharge lamp apparatus of claim 4.

6. A high-pressure discharge lamp lighting method comprising:
   a lighting step of supplying an alternating current to a high-pressure discharge lamp to cause lighting, the high-pressure discharge lamp having an arc tube in which a halogen material is enclosed and a pair of electrodes is disposed, each electrode having a protuberance at a tip thereof, the protuberance formed through a halogen cycle; and
   a frequency controlling step of switching, during a continuous operation of the high-pressure discharge lamp, a frequency of the alternating current intermittently among two or more different values without dependency on operating data that varies with an elapsed lighting time of the high-pressure discharge lamp, wherein
   a maximum frequency of the alternating current is in a range of 300 Hz to 500 Hz inclusive, and is at least three times a minimum frequency of the alternating current.

* * * * *

UNITED STATES PATENT AND TRADEMARK OFFICE
Certificate

Patent No. 8,063,572 B2            Patented: November 22, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Minoru Ozasa, Kyoto (JP); Syunsuke Ono, Osaka (JP); Masaru Ikeda, Osaka (JP); and Masahiro Yamamoto, Osaka (JP).

Signed and Sealed this Thirty-first Day of July 2012.

DOUGLAS OWENS
*Supervisory Patent Examiner*
Art Unit 2821
Technology Center 2800